(12) United States Patent
van der Eerden et al.

(10) Patent No.: US 8,371,836 B2
(45) Date of Patent: Feb. 12, 2013

(54) METHOD AND MOULDING DEVICES FOR MOULDING THREE-DIMENSIONAL PRODUCTS

(75) Inventors: Hendricus Franciscus Jacobus Maria van der Eerden, Gemert (NL); Barend Jacobus Emmanuel Beijaard, Oploo (NL); Cornelis Laurentius Bernardus Verhoeven, Gennep (NL); Dirk Meskendahl, Kranenburg (DE)

(73) Assignee: Stork Titan B.V., AV Boxmeer (NL)

( * ) Notice: Subject to any disclaimer, the term of this patent is extended or adjusted under 35 U.S.C. 154(b) by 0 days.

(21) Appl. No.: 13/178,546

(22) Filed: Jul. 8, 2011

(65) Prior Publication Data

US 2012/0003374 A1    Jan. 5, 2012

Related U.S. Application Data

(62) Division of application No. 10/519,071, filed as application No. PCT/NL03/00470 on Jun. 26, 2003, now Pat. No. 7,976,303.

(30) Foreign Application Priority Data

Jun. 26, 2002  (NL) .................................... 1020942

(51) Int. Cl.
A22C 7/00       (2006.01)
B23P 11/00      (2006.01)
A23L 1/31       (2006.01)
B29C 43/04      (2006.01)

(52) U.S. Cl. ....................... 425/241; 425/365
(58) Field of Classification Search .................. 425/99, 425/241, 365
See application file for complete search history.

(56) References Cited

U.S. PATENT DOCUMENTS

| 206,771 A | 8/1878 | Caldwell |
| 2,651,808 A | 9/1953 | Burnett et al. |
| 3,008,594 A | 11/1961 | Toennies |
| 3,205,837 A | 9/1965 | Fay |
| 3,490,391 A | 1/1970 | Vogt |
| 3,561,372 A | 2/1971 | Vogt |
| 3,718,524 A | 2/1973 | Bright |
| 3,789,909 A * | 2/1974 | Smith ........................... 164/479 |

(Continued)

FOREIGN PATENT DOCUMENTS

| AU | 734662 B2 | 6/2001 |
| GB | 289293 A | 4/1928 |

(Continued)

OTHER PUBLICATIONS

European Search Report, dated Oct. 20, 2011.

(Continued)

*Primary Examiner* — Joseph Del Sole
*Assistant Examiner* — Kimberly A Stewart
(74) *Attorney, Agent, or Firm* — Blank Rome LLP

(57) ABSTRACT

The invention provides a method for molding three-dimensional products from a mass of foodstuff starting materials which are suitable for consumption, in particular a meat mass. The method comprises the steps of filling a mold cavity, which is open on one side, with the mass of foodstuff starting materials which are suitable for consumption, which mold cavity is defined by a boundary comprising walls and base, in order to mold a molded three-dimensional product, and the removal of the molded three-dimensional product from the mold cavity. In the method according to the invention, during removal the adhesion forces between the molded product and the boundary are eliminated virtually simultaneously along all the interfaces.

26 Claims, 15 Drawing Sheets

U.S. PATENT DOCUMENTS

| | | | |
|---|---|---|---|
| 3,851,355 A | | 12/1974 | Hughes |
| 3,941,538 A | | 3/1976 | Orlowski |
| 4,061,706 A | * | 12/1977 | Duffield et al. ............... 264/571 |
| 4,212,609 A | | 7/1980 | Fay |
| 4,684,040 A | | 8/1987 | Jonovic et al. |
| 4,828,863 A | | 5/1989 | Aoki |
| 4,957,425 A | | 9/1990 | Fay |
| 4,987,643 A | | 1/1991 | Powers et al. |
| 5,297,947 A | | 3/1994 | Cardinali |
| 5,382,145 A | | 1/1995 | Harreither |
| 5,462,425 A | | 10/1995 | Kuss et al. |
| 5,554,333 A | | 9/1996 | Fujiki |
| 2002/0012731 A1 | | 1/2002 | van Esbroeck et al. |

FOREIGN PATENT DOCUMENTS

| | | |
|---|---|---|
| JP | 53137190 U | 10/1978 |
| JP | S63-47104 | 2/1988 |
| JP | H02-20487 | 2/1990 |
| JP | HO5-500451 | 2/1993 |
| JP | H10-299807 | 9/1998 |
| JP | 11-105083 | 4/1999 |
| JP | 2001 299317 A | 10/2001 |
| WO | WO-91/01644 | 2/1991 |
| WO | WO-98/12934 A1 | 4/1998 |
| WO | WO-00/30458 A1 | 6/2000 |

OTHER PUBLICATIONS

Japanese Office Action, mailed Jun. 25, 2008.

JP Office Action dated Aug. 15, 2012, cited in JP Application No. 2010-256930.

* cited by examiner

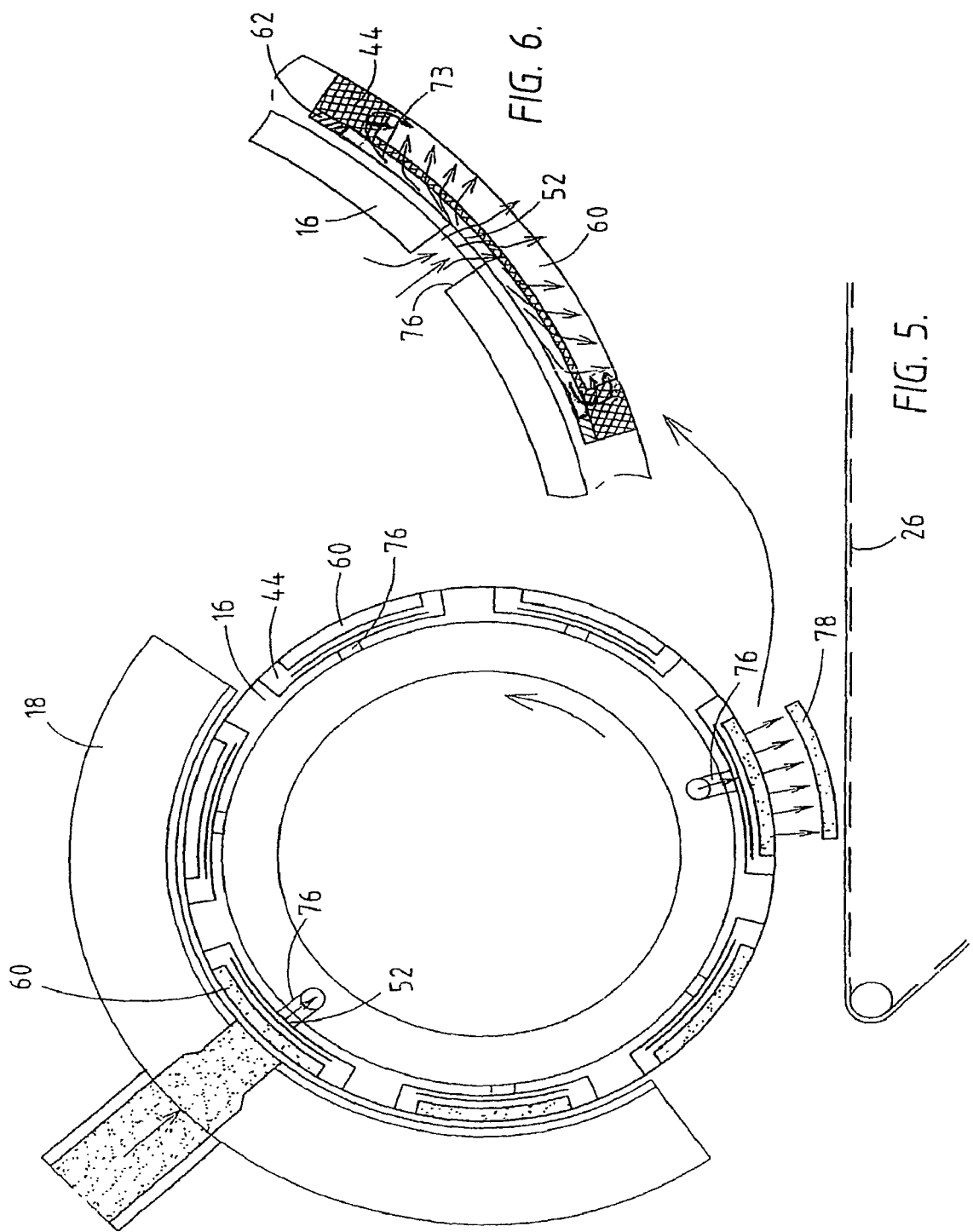

METHOD AND MOULDING DEVICES FOR MOULDING THREE-DIMENSIONAL PRODUCTS

This application is a divisional of U.S. application patent Ser. No. 10/519,071, filed Dec. 23, 2004, which is a National Stage of International Application No. PCT/NL03/00470, filed Jun. 26, 2003, which claims priority to Application No. NL1020942, filed Jun. 26, 2002, all of the contents of which are hereby incorporated by reference in their entirety.

BACKGROUND OF THE INVENTION

The invention relates in general to the moulding of three-dimensional products from a mass of foodstuff starting materials which are suitable for consumption, in particular from a meat mass. More specifically, the invention relates to a moulding method, moulding devices and components which can be used in moulding devices.

SUMMARY OF THE INVENTION

A first aspect of the invention relates to a method for moulding three-dimensional products from a mass of foodstuff starting materials which are suitable for consumption, in particular a meat mass, comprising the steps of
a) filling a mould cavity, which is open on one side, with the mass of foodstuff starting materials which are suitable for consumption, which mould cavity is defined by a boundary comprising walls and base, in order to mould a moulded three-dimensional product; and
b) removing the moulded three-dimensional product from the mould cavity.

A method of this type and a device used for the method are known in the art, for example from the international patent application WO-A-00/30458 in the name of the Applicant and can be used to mould edible products from, for example, kneaded meat. This known device of the so-called "rotating drum type" has a rotatable drum which is driven continuously by an associated drive. A plurality of mould cavities which define the shape of the products which are to be produced are located on the outer side of the drum. At the filling position there is a filling member which fills the mould cavities which move past it during rotation with the mass. The products formed in this way are removed from the mould cavities at a release position located downstream of the filling position. This known moulding device uses means for exerting fixing pressure which are designed to exert a fixing pressure which acts on the mass in the mould cavity after the filled mould cavity has been closed. This fixing pressure differs from the filling pressure, which is exerted on a portion of the mass during filling of a mould cavity with this portion. The fixing pressure is used to make the pieces of the mass stick together after the filling operation and in this way to obtain a dimensionally stable product of the desired end weight which can be removed from the mould cavity.

In addition, this application describes a number of techniques used to assist with the removal of moulded products from the mould cavities in question under the influence of the force of gravity. In one embodiment, during each revolution of the drum a web of a film is placed in a mould cavity. For removal, stress is imparted to the web from one side, so that the web and therefore the moulded product are lifted out of the mould cavity from one side. If appropriate, the removal can be further assisted by compressed air being blown in beneath the web from a central point located in the base of the mould cavity. In another embodiment, a flexible membrane is secured in a mould cavity in order to prevent contamination. The base of the mould cavity is in communication with an air source and/or vacuum means at various locations, via passages. By selective actuation, it is possible for the flexible membrane to be sucked into the mould cavity or for a moulded product to be removed. In this embodiment too, the removal can be assisted by compressed air which is blown onto the underside of the membrane from a central location and from points located in the vicinity of the peripheral edge of the base.

Now, it has been found that the shape of the moulded product is insufficiently uniform, in particular their edge definition. This leads to product loss. Defects which have been observed include the formation of lips, small pieces which break off at the edges, dents and the like.

Furthermore, it has been found that the service life of the plastic films used leaves something to be desired. The service life is short, meaning that they have to be replaced frequently, with all the associated drawbacks relating to production idle time, maintenance work and other costs.

A further drawback of these known techniques is that it is difficult to monitor and maintain hygiene in these devices on account of the number of parts which come into contact with foodstuff starting material.

It is an object of the present invention to provide a method and devices with which it is possible to provide products with a shape which is more uniform over, the course of time. Another object of the invention is to provide a method and devices which can be used to produce products with a low spread in weight. Yet another object of the invention is to provide such a method and device in which the number of components which come into contact with the foodstuff starting material is very small.

In the method according to the invention, to this end step b) comprises the removal of the adhesion forces between product and boundary of the cavity substantially simultaneously at all the interfaces between the moulded three-dimensional product and the boundary. According to the invention, the adhesion forces are substantially eliminated, at the time of release, at all the surfaces of the moulded product which are in contact with the base and peripheral wall simultaneously. It has been found that the removal of a moulded product is simpler and leads to less production loss if the adhesion forces are eliminated on all sides (apart from the open side of the mould cavity). The release occurs partly as a result of the force of gravity (the inherent weight of a moulded product), with a force of this nature simultaneously being boosted by eliminating the adhesion forces on all sides. As a result of release occurring on all sides simultaneously, the edge definition of the moulded product is greatly improved compared to the prior art, and the finished moulded product more accurately corresponds to the mould cavity, since it retains the shape. It should be emphasized that in the invention, in addition to the force of gravity a force is temporarily also exerted for the purpose of removing the moulded product from a mould cavity, which force is not produced by mechanical means which are in contact with the product, such as for example a plunger. Furthermore, this additional expulsion force is generated at the time of release and is not permanently present, as for example in the case of a non-stick layer. The reproducibility of the shape of the moulded products in the device according to this aspect of the invention is improved in this way, as is the reproducibility of the weight. In addition, there is no need for any additional materials, such as the disposable film used in the moulding device according to the prior art, or for the associated processing equipment.

A means for eliminating the adhesion forces is advantageously used to remove the adhesion forces. In this context, use is made of the differences in properties of the means which eliminates the adhesion forces and those of the foodstuff starting material from which the product is moulded. The preferred examples of this means comprise a forcing fluid (a pressurized fluid), an optionally permanent coating of the boundary with a coating material whose action of eliminating adhesion forces can be activated, for example by applying an electrostatic charge, by bringing about a change in the state of aggregation, for example from solid to liquid or liquid to gaseous, for example converting a film of water into steam by heating, or by the initiation of a chemical reaction, in which case opposing forces are generated or the inherent adhesion properties are reduced, or a visco-elastic substance whose action is dependent on the filling pressure and time used. Combinations of these measures are also possible.

It is more preferable to use a forcing fluid, in particular compressed air or steam. Combinations of compressed air in which a liquid constituent is dispersed, such as water, for humidification, can also be used. Moreover, this opens up the possibility of implementing a desired addition, if necessary, to the product, for example a (preserving) salt dissolved in water, or oil, etc. The boundary is permeable in order to allow the supply of a forcing fluid of this type.

For a forcing fluid to be supplied on all sides (apart from the open top side), it is advantageous for the boundary of a mould cavity to be provided with passages with openings which, distributed over base and peripheral wall of the mould cavity, open out at the surface of the boundary, with a pressurized fluid being fed to the passages. The passages may be of any desired shape, rectilinear, angled or curved, may be regular or irregular, taper or may widen out at their end. The shape and size of the passages partly determine the depth of penetration of the mass into the boundary and the through-flow of the fluid in the boundary, and therefore the forces exerted by the fluid. In addition, it is preferable for the size of the outlet openings of the passages to be selected in such a way that the pieces of the foodstuff starting material are not caught in the passages. This will be explained in more detail below. Examples of a material used for this type of boundary include a perforated plate or a foil provided with openings, for example made from nickel or stainless steel. Passages can be formed, for example, using a laser treatment. Etching or electroforming are other examples of suitable production techniques.

A particularly preferred boundary comprises a porous structure of intercommunicating pores. In this way, it is possible to obtain a uniform distribution of the forcing fluid over all the interfaces between the boundary and the moulded product, which assists with the uniform removal of the product. The pore size will be selected as a function of the starting material to be processed and the forcing fluid used. By way of example, it has been found that in the case of porous boundaries made from sintered stainless steel with effective pore diameters in the range from approximately 1-20 micrometers, effective removal can be achieved for a specific meat mass. Combinations of passage structures and porous structures are also among the possible options.

Examples of suitable materials for the porous structure of the boundary include ceramic materials, plastics and metals, including in particular sintered steel.

It should be noted that the patent publications U.S. Pat. No. 4,987,643 and U.S. Pat. No. 4,212,609 have per se disclosed moulding machines in which the mould cavities have a base which can move up and down for removal of moulded products, which base is porous and is in communication with a supply of compressed air or the like to assist with removal of the moulded products from the mould cavities.

The mould cavities are advantageously formed in the porous boundary by spark erosion. The production of a mould from porous metal often uses a treatment which causes the openings of the pores which open out at the surface to be virtually completely closed up. Spark erosion causes the porous structure of the boundary to be opened up again at the location of the mould cavity.

After use, the passages and/or openings can also be used for cleaning of the mould cavities, for example by water or steam, optionally with the addition of a cleaning agent or disinfectant, being fed to them.

According to a further preferred embodiment, during step a) air which is enclosed between the mass and the boundary is discharged through the boundary. The boundary structure with passages and/or pores is eminently suitable for this purpose. Complete filling of a mould cavity is achieved by removing this air, for example sucking it out with the aid of suction means, so that the enclosed air does not leave any traces in the shape of the finished product or interferes with uniform removal.

According to a second aspect, the invention relates to a device for moulding three-dimensional products from a mass of foodstuff starting materials which are suitable for consumption, in particular a meat mass, comprising
a moulding surface, which is provided on one side with one or more mould cavities which are open on one side and are defined by a boundary comprising walls and base,
a mass feed member, which is arranged at a mass feed position, for feeding the said mass to the mould cavities.

A device of this type, in which the moulding surface is the outer wall of a drum, is known from the abovementioned WO publication WO 00/30458.

According to the invention, the device also comprises means for simultaneously removing the adhesion forces between product and boundary of the mould cavity at all interfaces between a moulded three-dimensional product and the boundary. A device of this type achieves the above-described advantages relating to edge definition and uniformity of shape and weight of the moulded products.

The said means will be selected as a function of the embodiment in question.

If a forcing fluid is used as the means which eliminates the adhesion forces, the said means comprise excess-pressure means which are in fluid communication with the boundary of a mould cavity and are used to supply a pressurized fluid, such as compressed air or water. For a uniform distribution of the forcing fluid, it is advantageous for the boundary to be provided with passages with openings, which passages are in communication with excess-pressure means. More preferably, the boundary comprises a porous structure of intercommunicating pores, for the reasons outlined above.

According to another preferred embodiment, the said means form an optionally permanent coating of the mould cavity, as explained above in connection with the method according to the invention.

In yet another preferred embodiment, the device also comprises reduced-pressure means for forming reduced pressure in a mould cavity during the filling operation, so that enclosed air can be sucked out.

To obtain a simple structure of the device, in particular the system of lines used to supply a pressurized fluid or remove air, it is advantageous for a connecting passage to be in communication with the boundary of a mould cavity, which connecting passage can be selectively coupled to the reduced-pressure means and the excess-pressure means.

The moulding surface is advantageously made completely from sintered metal in which the mould cavities are formed by spark erosion. A single-piece moulding surface is a component which is easier to exchange when the moulding device needs to be used for the production of a different product shape or when the moulding device is presented for maintenance, such as cleaning, or for repair.

With a view to product flexibility, it is advantageous for the moulding surface to be provided with recesses in which corresponding inserts are releasably accommodated, these inserts comprising the mould cavities. In an embodiment of this type, the inserts are exchangeable, so that a variety of products can be moulded using the same moulding surface.

The recesses are advantageously substantially rectangular in shape, and if the outer wall of a drum is the moulding surface, the inserts comprise a substantially corresponding rectangular body, of which only the upper surface, in which the mould cavity is located, has a radius of curvature matching the radius of curvature of the drum. Recesses of this form are relatively easy to manufacture into the drum, and the corresponding inserts can also be produced in a simple way.

In a further advantageous embodiment thereof, the height of an insert is slightly smaller than the depth of the recess, and spacers are provided between the base of the recess and the underside of the insert, so that there is a space which can function as a collection chamber for extracted air or distribution chamber for a forcing fluid. Obviously, it is also possible for the spacers to form an integral part of the inserts, for example in the form of small legs.

The method described above can be carried out with various types of moulding devices, for example a turntable, a turret, a drum or an optionally stationary flat plate.

With a view to achieving a high production rate, the moulding surface is preferably the wall of a drum which can be rotated in a direction of rotation by associated drive means and is provided with at least one mould cavity which is open at the outer circumference of the drum and has an associated boundary comprising walls and base.

According to a third aspect, the invention relates to a moulding surface for moulding three-dimensional products, in particular a moulding drum, from a mass of foodstuff starting materials which are suitable for consumption, in particular from a meat mass, provided on one side with one or more mould cavities which are open on one side and are defined by a boundary comprising walls and base. A moulding surface of this type in the form of a drum is known from WO-A-00/30458, as discussed above. According to the invention, the walls and base which form the boundary are provided with holes which extend through the boundary. A moulding surface of this type allows the adhesion forces between the boundary and a moulded product to be removed virtually simultaneously at all the interfaces, for example using a forcing fluid as has also been explained above. This leads to the abovementioned advantages with regards to simplicity and ease of removal and reduced product wastage. Furthermore, this leads to more rapid removal, so that a higher production rate can be achieved.

The moulding surface is advantageously a moulding drum. A drum of this type has a substantially cylindrical drum wall. The drum diameter is, for example, 0.15 to 0.7 m, while the length may vary from a few tens of centimetres, for example 30 cm, to a few metres. The drum may be made from a single piece, such as for example a pipe, or from a plurality of interconnected pipe sections, reinforcements being provided if desired, for example ribs, plates or prestressing means. The mould cavities are provided in the outer side of the drum wall, for example in the form of rows which are parallel in the axial direction or offset. Other examples of moulding surfaces are straight plates, a turntable or a turret.

The holes advantageously have a shape and/or dimensions which are such that the mass is subject to sufficient resistance for it not to penetrate deeply into the holes as a result of the filling pressure applied to the mass, which can generally be regarded as a visco-elastic material, during the filling operation. Since the filling pressure is only applied for a short time during filling, given sufficient resistance the mass will only be deformed slightly and will only be able to penetrate into the holes to a slight extent. If the mass penetrates relatively deeply into the holes, there is a risk of the mass or pieces of it being caught in the holes during removal. This risk can be avoided in accordance with the invention. Irregular, angular or curved holes are examples of suitable shapes, since they provide a sufficiently great counterpressure to the mass during filling. Holes with relatively, small openings at the surface of the boundary which defines the mould cavity also offer a resistance of this nature. One example is holes which taper towards the said boundary surface. In addition, shaping and/or dimensioning the holes in this way has the advantage that the forcing means, which can generally flow to a greater extent than the mass of starting material, exerts expulsion pressure on the mass via all the holes during the removal operation and scarcely escapes along those holes where the mass may, already have been released. The shape and/or dimensions of the holes are advantageously selected as a function of the rheological properties of the starting material and the forcing means used.

In a preferred embodiment, the holes or passages with openings open out in the mould cavity. The openings may be distributed regularly or irregularly over the base and wall. By way of example, it is possible for the number of passages in the vicinity of the transition from the base to the wall to differ from, for example be greater than, the number of passages in the remaining surface of these walls and base.

In another preferred embodiment, the holes comprise a porous structure of intercommunicating pores. An embodiment of this type allows a uniform distribution of the holes over the boundary and therefore allows uniform removal of a moulded product from the mould cavity.

As has already been described above, a boundary is advantageously made from sintered metal, more particularly by means of spark erosion. The moulding surface is advantageously made from a porous sintered metal, of which the pore openings which open out at the surfaces are sealed off by the machining steps carried out during production of the moulding surface, after which the mould cavities are manufactured by spark erosion, so that the pore openings are locally opened up again.

In a further preferred embodiment, the moulding surface with the mould cavities therein is produced from one piece, more particularly having similarly shaped mould cavities. A moulding surface of this type can be exchanged quickly and easily, for example if a product change is to be carried out, compared to a moulding surface with moulding elements which can be exchanged separately and have one or more mould cavities, with each moulding element having to be changed separately, requiring a large number of operations. This relatively high exchange speed reduces the time required for maintenance, repair or changeover, so that the idle time of the moulding device in which the moulding surface is used can be kept short.

The invention also relates to an assembly of at least two moulding surfaces for moulding three-dimensional products, in particular moulding drums according to the invention, in which the shape of the mould cavities in one moulding surface is identical and is different from the shape of the mould cavities in another moulding surface. As has been explained above, moulding surfaces of this type can be exchanged quickly and easily.

Other advantageous embodiments of a moulding surface according to the invention have already been discussed above in connection with the first two aspects of the invention.

According to a further aspect, the invention relates to a moulding device for moulding three-dimensional products from a mass of foodstuff starting materials which are suitable for consumption, comprising a drum which can be rotated in a direction of rotation by associated drive means and has a drum wall which is provided with mould cavities which are open on the outer circumference of the drum and are delimited by a boundary comprising walls and base, a mass feed member, which is arranged at a mass feed position along the outer circumference of the drum, for supplying the said mass to the mould cavities, and reduced-pressure means for forming a reduced pressure in the mould cavities.

A moulding device of this type is known from the abovementioned international patent application WO-A-00/30458 in the name of the Applicant and can be used to mould edible products from, for example, kneaded meat. This known device of the so-called "rotating drum type" has a rotatable drum which is driven continuously by an associated drive. On the outer side of the drum there are a plurality of mould cavities which determine the shape of the product which is to be produced. At a filling position there is a filling member which fills the mould cavities which move past it during rotation with the mass. The products which have been moulded in this way are removed from the mould cavities at a release position located downstream of the filling position. This known moulding device uses means which exert a fixing pressure and are designed to exert a fixing pressure which acts on the mass in the mould cavity after the filled mould cavity has been closed. This fixing pressure is distinct from the filling pressure which is exerted on a portion of the mass during the operation of filling a mould cavity with this portion. The fixing pressure is used to make the pieces of the mass adhere together after the filling operation and in this way to obtain a dimensionally stable product of the desired end weight which can be removed from the mould cavity.

In one embodiment of this known device, which is described in WO-A-00/30458, a strip of elastically deformable (plastics) material bears against the outer circumference of the drum from an application position located upstream of the filling member to a release position of the product at the underside of the drum. This strip has the function of covering the base and side walls of the mould cavities and passage openings provided therein, so that they do not come into direct contact with the mass. By generating reduced pressure, the strip is sucked into the mould cavities, onto the walls and base thereof. After the load has been relieved, the strip returns to its original form, so that the products can be released from the strip by guiding the strip upwards at an acute angle. As a result, the products drop off the strip, since these products are not able to follow this sudden change in direction of the strip.

However, it has been found that the service life of the plastic films used leaves something to be desired. The service life is short, and consequently the films have to be replaced frequently, with all the associated drawbacks with regard to idle time, maintenance work and other costs.

Furthermore, it has been found that the edge definition of the moulded products is not always sufficient, which can lead to product loss.

In addition, the release from the mould cavities is not always satisfactory, which likewise has an adverse effect on the quality of the moulded products.

According to this aspect, the present invention is based on the broad object of improving the abovementioned shortcomings. More particularly, it is an object of the invention to provide a moulding device for providing edible, three-dimensional products with a considerable strip service life. In addition, it is an object of the invention to provide a moulding device which can be used to produce products of the desired shape. It is also an object of the invention to provide a moulding device from which products can be released effectively.

According to this aspect, the invention provides a moulding device of the type described in the preamble, in which around the outer circumference of the drum there is a strip, the strip being provided, at the location of a mould cavity, with a flexible premould which substantially corresponds to the mould cavity. In this moulding device according to the invention, there is a strip wrapped around the drum, preferably made from a plastics material, in which there are prefabricated flexible premoulds at the location of the mould cavities. Since the premoulds, the shape of which is virtually identical to that of the corresponding mould cavities, are formed in the strip prior to operation, these premoulds can be sucked into the mould cavities with the aid of the reduced-pressure means more quickly and more easily than in the case of the strip according to the prior art, which in each case returns to its original, planar shape and is continuously renewed.

The ends of the web from which the strip is formed can be fixed to the drum using adhesive tape, glue, mechanical securing means or the like. The ends can also be secured to one another, for example by hot-welding, so that an endless strip is formed.

It is preferable for there also to be excess-pressure means which are in communication with the mould cavity and are designed to feed a pressure medium to a mould cavity. When a pressurized medium, for example compressed air, is fed to the mould cavity between, on the one hand, the base and walls thereof and, on the other hand, the underside of the flexible premould, the premould together with the moulded product is pushed out of the mould cavity, so that it is possible to simplify the release of the moulded product.

To ensure that during the fluctuating load on the strip as a result of the flexible premoulds being repeatedly sucked in and expelled the strip is not pushed off the drum, the flexibility of the premoulds is preferably greater than the flexibility of the surrounding part of the strip. The relatively rigid part of the strip is held taut around the drum, while the premoulds are sufficiently flexible to adapt to the varying pressure conditions.

In order to maintain the correct positioning of the strip on the drum, in particular the flexible premoulds with respect to the mould cavities, during operation, the strip advantageously has a sandwich structure which comprises a layer with flexible premoulds from a first plastics material and a layer with openings in it, the periphery of which openings substantially corresponds to that of the flexible premoulds, made from a second plastics material with a higher rigidity than the first plastics material.

A thermoplastic elastomer is advantageously used for the first plastics materials of the layer with flexible premoulds. The second plastics material may, for example, be polystyrene. In general, the second plastics material will be positioned on the drum side.

The premoulds can therefore be produced by preheating to above the softening point of the thermoplastic and deformation, followed by cooling, while the elastic properties ensure that the premoulds can bear in the correct position against the walls and base of the mould cavity. If the drum itself can be heated, it can be used, starting from a flat strip, to form the premoulds therein on a one-off basis prior to the filling operation, in the manner described above. An example of a suitable thermoplastic elastomer is SEBS.

The premoulds are advantageously formed in a planar strip by thermoforming. Premoulds formed in this way produce products with a higher edge definition compared to the prior art during moulding.

In order to increase the service life of the strip still further, at the outer periphery the strip is preferably protected by a protective strip made from wear-resistant material in which openings are provided, the periphery of which substantially corresponds to the periphery of the mould cavities in the drum. Since, during the filling operation, the strip with premoulds frequently comes into contact with the mass feed member past which the drum with strip rotates in a sealing manner with a view to preventing loss of starting materials, wear occurs as a result of the friction between mass feed member and strip. A thin flexible strip made from a metal or metal alloy, for example spring steel, provides the required wear resistance and in this way protects the plastic strip below. The ends of the protective strip can be attached to one another or to the drum in a suitable way, for example using hooks or a cam.

The invention also relates to a strip which is clearly intended for the abovementioned moulding device with at least one mould cavity according to the invention, which strip is provided, at a position corresponding to a mould cavity of the moulding device, with a flexible premould which substantially corresponds to the mould cavity. Preferred embodiments of this strip, as discussed above, are defined in the corresponding subclaims.

Furthermore, the invention relates to an assembly of a strip according to the invention of this type and a protective strip made from wear-resistant material in which there are openings, the periphery of which substantially corresponds to the periphery of the premoulds in the strip.

According to yet another aspect, the invention relates to a moulding device for moulding three-dimensional products from a mass of foodstuff starting materials which are suitable for consumption, comprising a drum which can be rotated in a direction of rotation by associated drive means and has a drum wall which is provided with mould cavities which are open at the outer circumference of the drum and are defined by a boundary comprising walls and a base; a mass feed member, which is arranged at a mass feed position along the outer circumference of the drum, for feeding the said mass to the mould cavities; and reduced-pressure means for forming a reduced pressure in the mould cavities.

A moulding device of this type is known from the international patent application WO-A-00/30458 in the name of the Applicant and can be used for the moulding of edible products made, for example, from kneaded meat. This known device, of the so-called "rotating drum type", has a rotatable drum which is driven continuously by an associated drive. On the outer side of the drum there are a plurality of mould cavities which determine the shape of the product which is to be produced. A filling member is arranged at a filling position and fills the mould cavities which move past it during rotation with the mass. At a release position located downstream of the filling position, the products formed in this way are removed from the mould cavities. In this known moulding device, means for exerting fixing pressure, which are designed to exert a fixing pressure on the mass in the mould cavity after the filled mould cavity has been closed, are used. This fixing pressure is distinct from the filling pressure which is exerted on a portion of the mass while a mould cavity is being filled with this portion. The fixing pressure is used to make the small pieces of the mass adhere together after the filling operation and in this way to obtain a dimensionally stable product which can be removed from the mould cavity.

In one of the embodiments of the known device, which are described in WO-A-00/30458, exchangeable moulds, for example made from metal or rigid plastic, with a mould cavity therein, are secured in the drum wall. To prevent contamination, a shape-restoring flexible membrane is arranged in the mould cavity. The base of the mould cavity is in communication with an air source and/or vacuum means via passages at various locations. By selective actuation, the flexible membrane can be sucked into the mould cavity or a moulded product can be removed.

Now, it has been found that it is difficult to exert a fixing pressure on the portion of the mass which has been introduced into a mould cavity, yet in a plurality of cases this operation is actually superfluous. Furthermore, it has been found that during operation, in some cases it is impossible to fill the entire mould cavity, and consequently the moulded products lack uniformity of shape and weight.

This aspect of the present invention is based on the general object of alleviating the abovementioned shortcomings. More particularly, it is an object of the invention to provide a moulding device for providing three-dimensional products from an edible mass, which moulded products have a uniform appearance and shape and an equal weight (within acceptable tolerances).

According to this aspect of the invention, in the case of the moulding device of the type described in the introduction, the boundary is at least in part provided with a large number of fine openings which are in communication with the reduced-pressure means.

In this moulding device according to the invention, the base and/or side walls, which together form the boundary of the mould cavity, comprise a large number of openings. The dimensions of these openings are such that no or scarcely any solid pieces of the mass of foodstuff starting materials can pass through them. These openings are connected to reduced-pressure means for generating a reduced pressure in the mould cavity during the filling operation. On account of the fact that air is sucked out of the mould cavity over a relatively large area and through a large number of openings compared to the local suction nozzles in accordance with the prior art, it is impossible for any air to be included during the filling of the mass. This inclusion of air is considered to be one of the possible causes of the non-uniform shape and variation in weight of the products in accordance with the above-described embodiment of WO 00/30458. The reproducibility of the shape of the moulded products is improved with the device according to this aspect of the invention in this way, as is the reproducibility of the weight. In addition, there is no need for any additional materials, such as the disposable film used in the moulding device according to this prior art, or for the associated processing equipment. Examples of a material for this boundary comprise a perforated plate or an electro-formed foil provided with openings, for example made from nickel or stainless steel.

In a preferred embodiment, the boundary comprises a porous structure of intercommunicating pores. A structure of this type, of which preferably the entire boundary of the mould cavity is composed, more preferably produced as a single unit, is permeable to gas or other fluid but is not permeable or is scarcely permeable to the small particles of the mass. A pore structure of this type allows the air to be sucked out of the mould cavity in a very uniform way, resulting in products with an even more uniform quality in terms of shape and weight.

It should be noted that moulding machines in which the mould cavities have a base which can move up and down in order to release moulded products, which base is porous and is in communication with a feed of compressed air or the like in order to assist with the release of the moulded products from the mould cavities, are known per se from patent publications U.S. Pat. No. 4,987,643 and U.S. Pat. No. 4,212,609.

Examples of suitable materials for the porous structure of the boundary include ceramic materials, plastics and metals, including in particular sintered steel.

According to a further preferred embodiment, the outer circumference of the drum is provided with recesses in which corresponding inserts are removably accommodated, which inserts comprise the mould cavities. In an embodiment of this type, the inserts are exchangeable, and consequently the changeover times from one product to another are relatively short, since the exchange of mould cavities required for this purpose can be carried out quickly and easily.

The recesses are advantageously substantially rectangular in shape, and the inserts advantageously comprise a substantially matching rectangular body, of which only the upper surface, in which the mould cavity is located, has a radius of curvature matching the radius of curvature of the drum. Recesses of this form are relatively easy to form in the drum and it is also easy to produce the associated inserts.

In a further expedient embodiment thereof, the height of an insert is slightly less than the depth of the recess, and spacers are provided between the base of the recess and the underside of the insert, so that there is a space which can function as a collection chamber or distribution chamber for air. Obviously, the spacers may also form an integral part of the inserts, for example in the form of small legs.

The openings of the boundary are advantageously also in communication with excess-pressure means which are designed to supply a pressure medium to the mould cavity, so that the release of products from the mould cavities as a result of their inherent weight can be assisted by a suitable pressure medium being passed through the fine openings from the inside outwards, so that the product is in this way pushed out of the mould cavity. Moreover, this opens up the option of carrying out a desired addition, if necessary, to the product, for example water or oil, etc. In this way, after use, it is also possible for the device, in particular its mould cavities, to be cleaned by rinsing with a cleaning agent.

In the base of the recess there are advantageously one or more openings which can be used for a number of purposes. It is preferable for a connecting passage to be in communication with the opening in the base of the recess, which connecting passage can be selectively connected to the reduced-pressure means and the excess-pressure means.

If desired, a release device, arranged at a release position, can be provided for removal of moulded products from the mould cavities. A release device of this type is useful primarily for the moulding device with flexible premoulds if the moulded products have a considerable tendency to stick to the flexible premoulds. The release device is designed in such a way that it has a separation element which can be introduced between the flexible premould and the moulded product without damaging either of them.

A preferred embodiment of a release device of this type comprises driveable endless conveyors which are arranged in parallel and describe a movement path about turning elements, between which conveyors there are connecting elements, in such a manner that the connecting elements, at the release position, pass virtually through the centre of the axis of the turning element in question. In this preferred embodiment, with this turning element, for example a turning roll or gearwheel, the movement path of the connecting elements is suddenly reversed at the release position. As a result of this reversal position being located along a tangent on the drum, in particular along the tangent on an ejected flexible premould, at a location where a moulded product moves out of the premould slightly as a result of its own weight, and as a result of the direction of movement being selected to be opposite to the tangential direction of movement of the drum, it is possible to achieve effective release. The connecting elements have a small surface area, so that the removed products do not stick to them, but rather can drop off onto a discharge belt which is guided along the bottom of the release device.

In an expedient embodiment of a release device of this type, the endless conveyors comprise chains, the links of which comprise an inwardly projecting part to which transverse spindles are connected.

It will be understood that a release device of this type can also be used for other applications, for example as what is known as a shooter belt for putting objects down in a metered manner onto another conveyor belt or onto positions where there is little space, and also in other known moulding devices.

The drum made, for example, from plastics or (sintered) metal—which may be solid or hollow—and is used in the preferred embodiments of the moulding devices according to the invention is difficult to produce with a constant diameter. This means that leakage may occur between the mass feed member and the outer circumference of the drum, which is undesirable with regard to loss of starting material but also on account of a resultant reduction in the quality of the moulded product.

To avoid this problem, the mass feed member advantageously comprises a housing in which there is a through-passage for mass to pass from an inlet to an outlet located on the drum side, the drum side bearing in a sealing manner against the drum and being designed to adapt to irregularities in the outer circumference of the drum. This ensures that the mass feed member, also known as the filling shoe, bears in a sealing manner against the drum, even when the drum is not perfectly cylindrical, so that loss of mass is limited and leakage during the application of a vacuum and/or pressure is avoided. For this purpose, the drum side of the filling shoe is flexible to a certain degree, so that it is able to follow any deviations.

In an appropriate embodiment, the drum side of the mass feed member comprises a flexible plate which is held against the outer circumference of the drum under pressure produced by excess-pressure means. A suitable material for the flexible plate is Teflon, which in addition to the required sealing action also imparts resistance to wear. According to a further preferred embodiment, the excess-pressure means comprise at least one pressure cushion, a number of lamellae, which are positioned transversely with respect to the direction of rotation of the drum, being arranged between the pressure cushion and the plate. These lamellae provide lines with a high rigidity in the axial direction of the drum, while the plate is able to follow deviations in the diameter of the drum. To further limit loss of mass resulting from the continuous supply, the drum side of the mass feed member, as seen in the circumferential direction of the drum, extends on either side of the outlet, over a distance which covers at least one mould cavity. If the mass feed member is operating continuously, it is if desired possible to provide a diverter passage, for example in the flexible plate, which on one side is in communication with the through-passage and on the other side is in communication with an outlet opening at a position, upstream of the outlet of the through-passage, where the next mould cavity to be filled is located. If there is no mould cavity in front of the outlet opening of the mass feed member, a partial stream of the mass is therefore introduced into the next mould cavity which is to be filled, until the latter can be filled via the ordinary outlet from the through-passage.

In order to enable the mass feed member to be used for various types of foodstuff starting material, including masses which include tough (muscle) fibres, it is advantageous for a cutting device to be provided in the through-passage on the drum side, preferably at the downstream edge of the through-passage, as seen in the direction of rotation.

BRIEF DESCRIPTION FO THE DRAWINGS

It will be understood that the abovementioned mass feed member is also suitable for use in moulding devices with a rotating moulding drum, other than the embodiments discussed above.

The invention is explained below with reference to the appended drawing, in which:

FIG. 5 shows a cross section through an embodiment of a moulding device according to the invention, illustrating its operation;

FIG. 6 shows a detail of the embodiment shown in FIG. 5;

Figure 11:
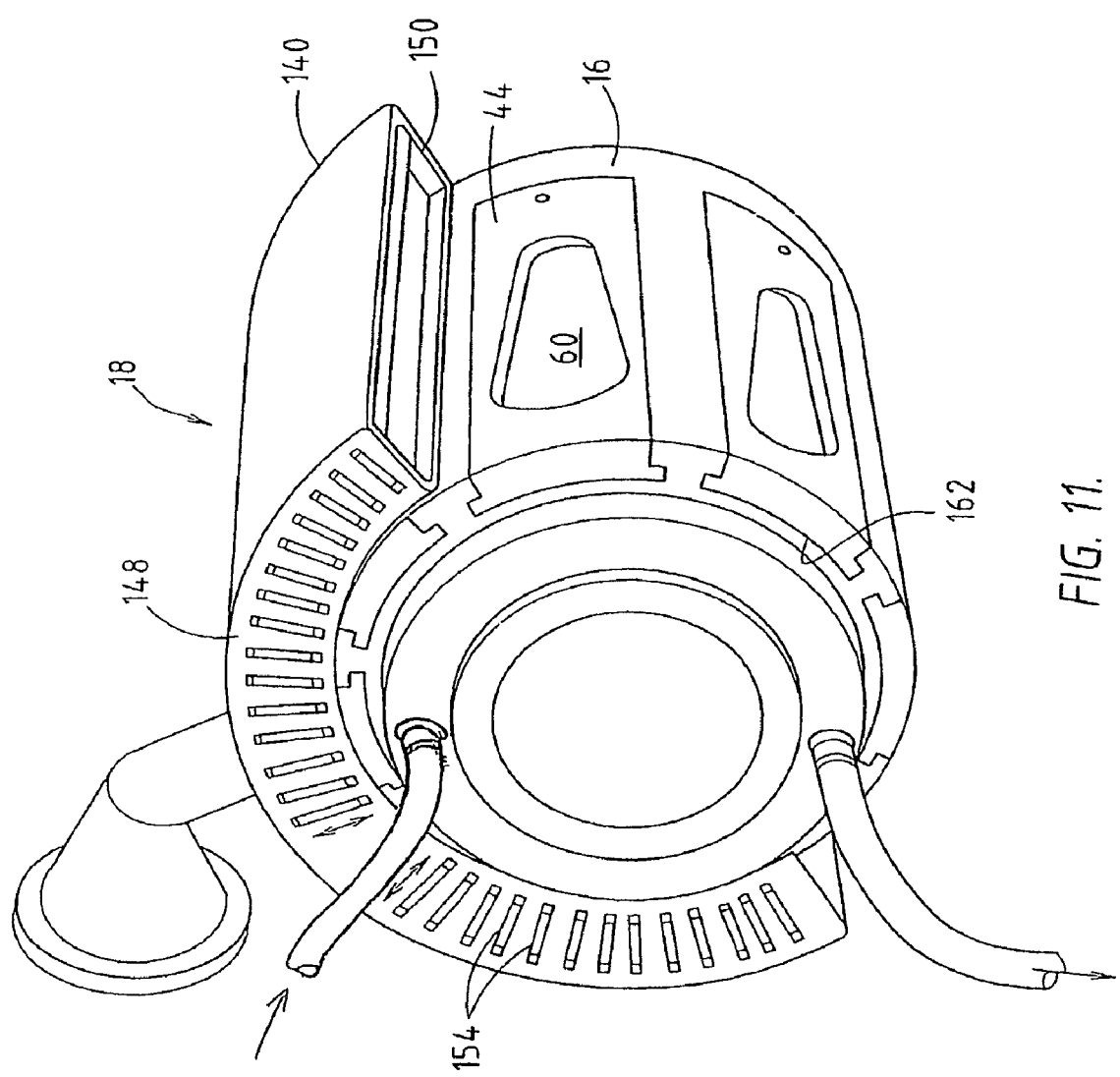
Figure 12:
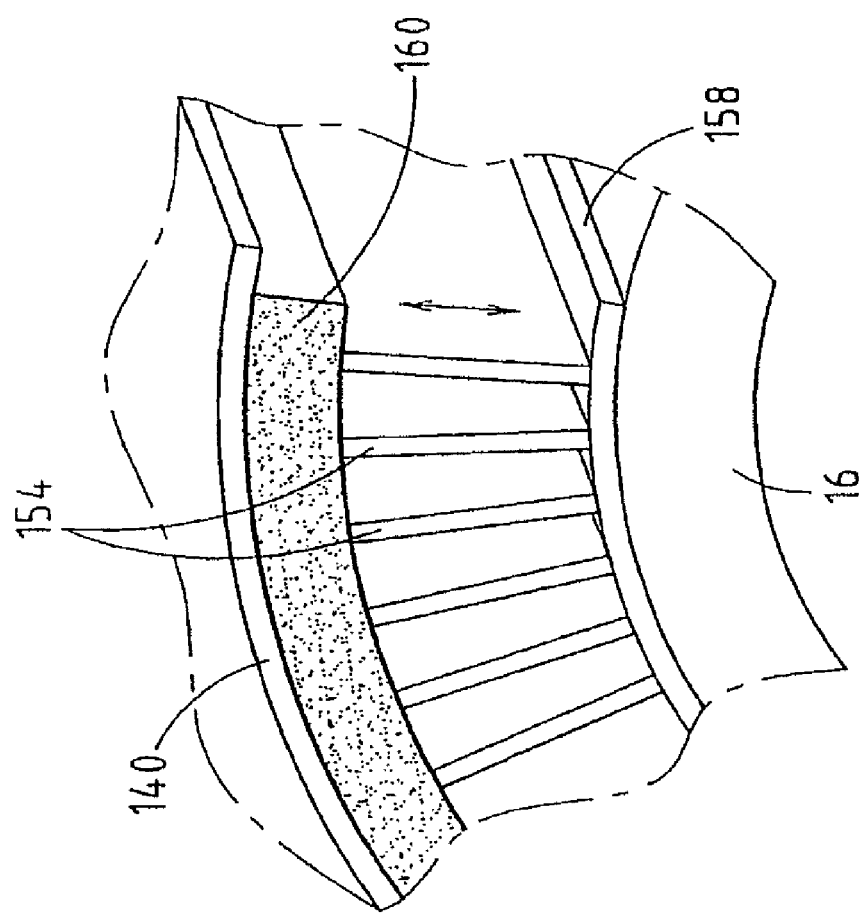
Figure 13:
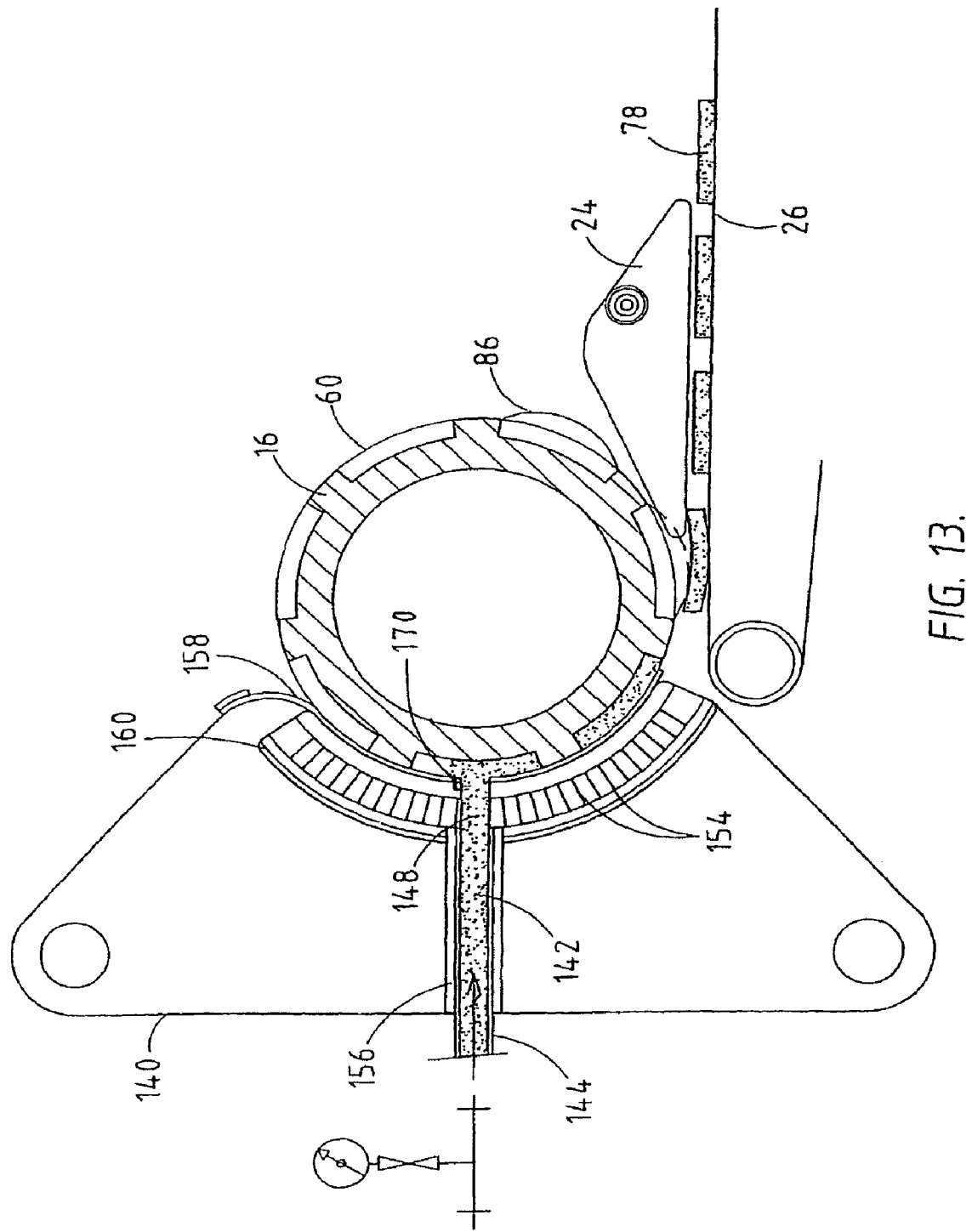
Figure 14:
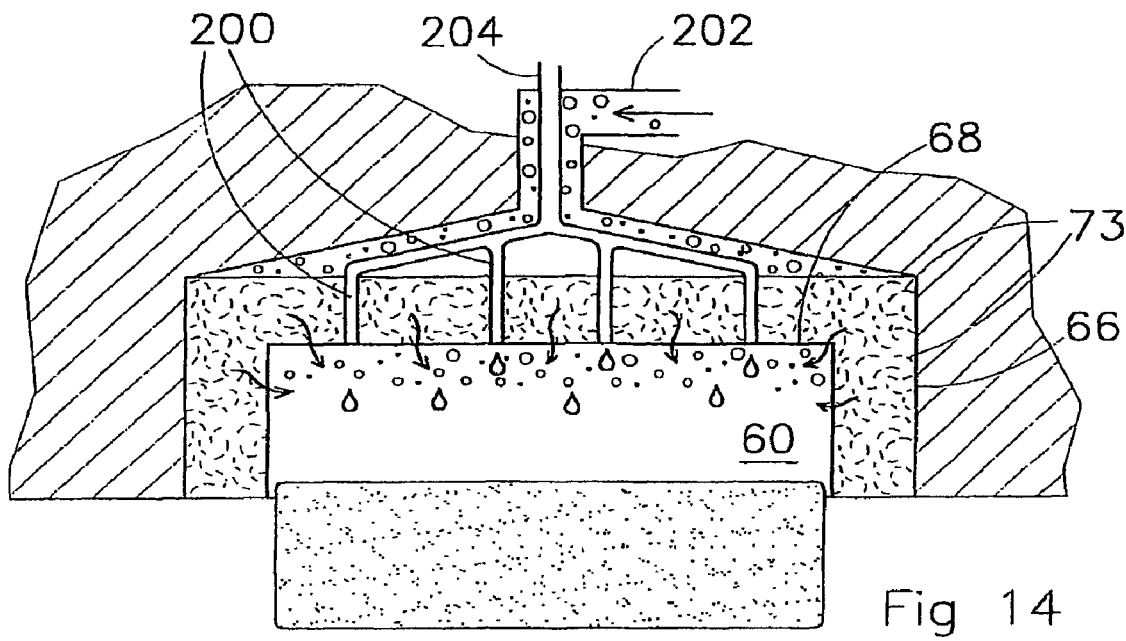
Figure 15:
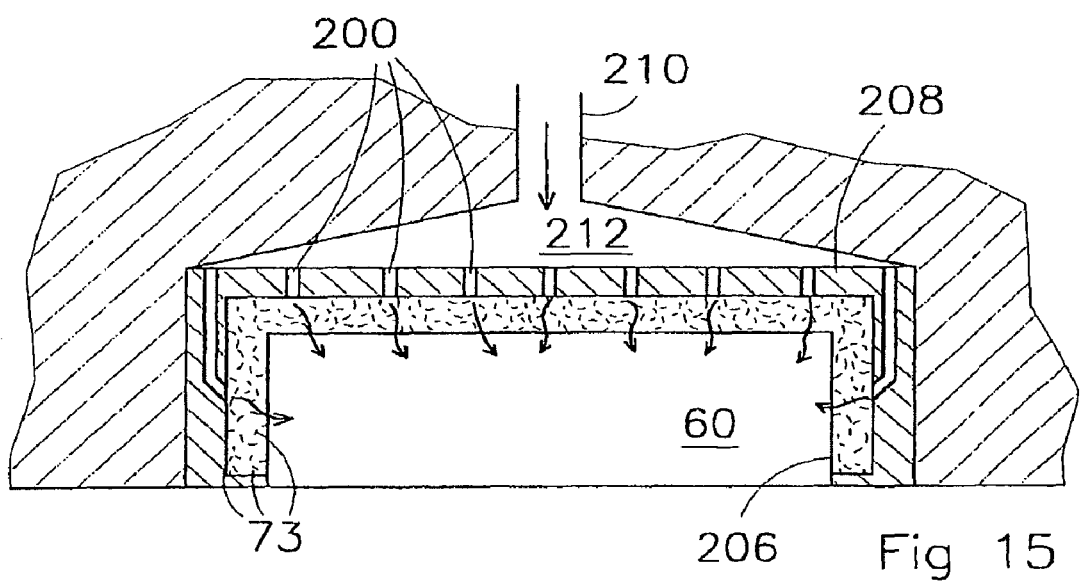
Figure 19:
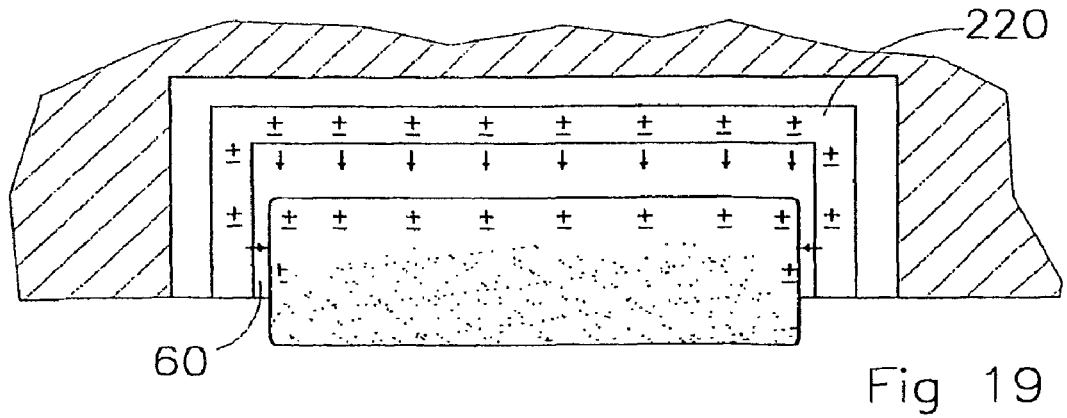
Figure 20:
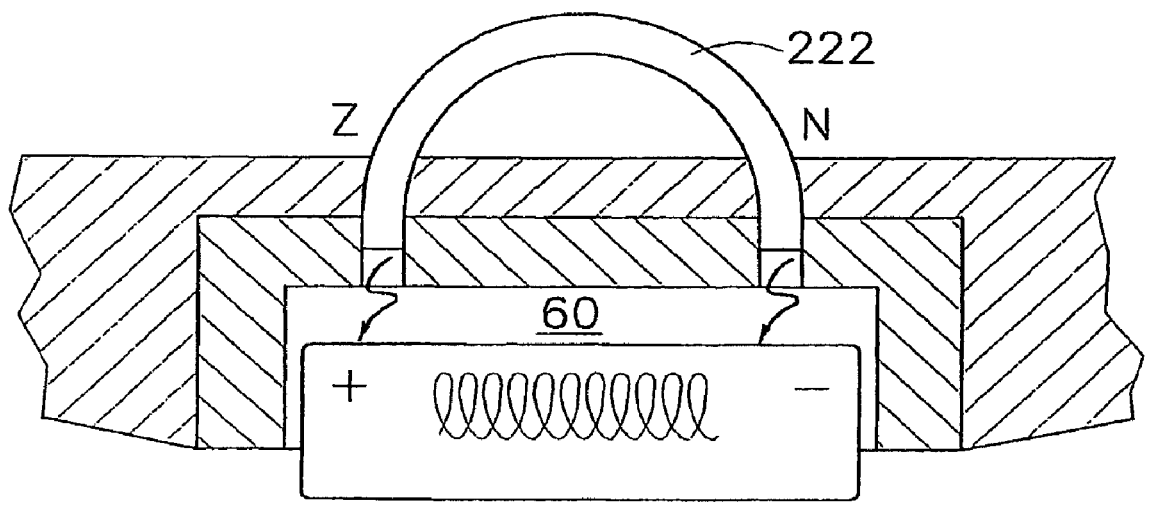
Figure 16:
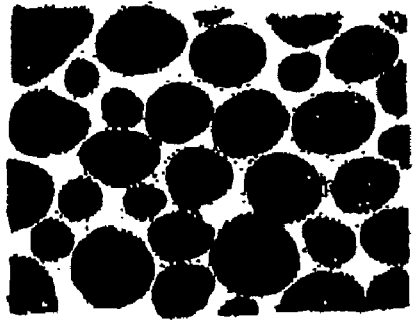
Figure 17:
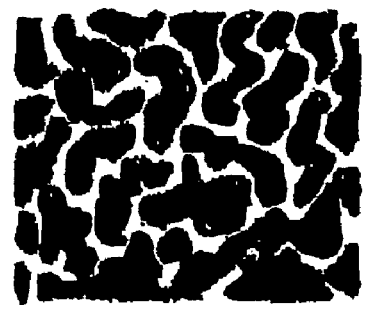
Figure 18:
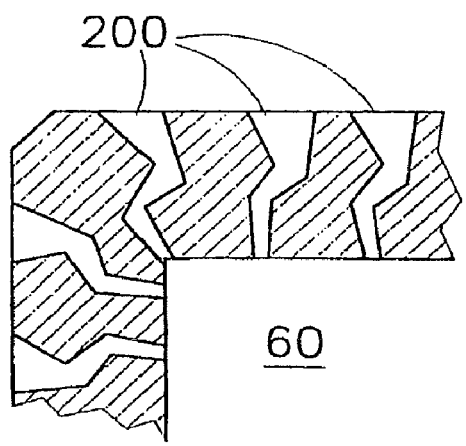
Figure 21:
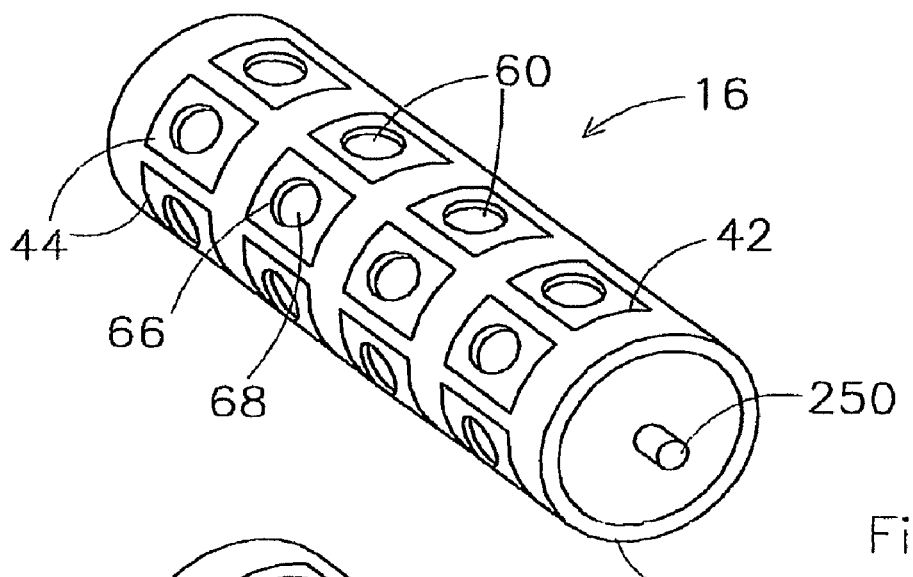
Figure 22:
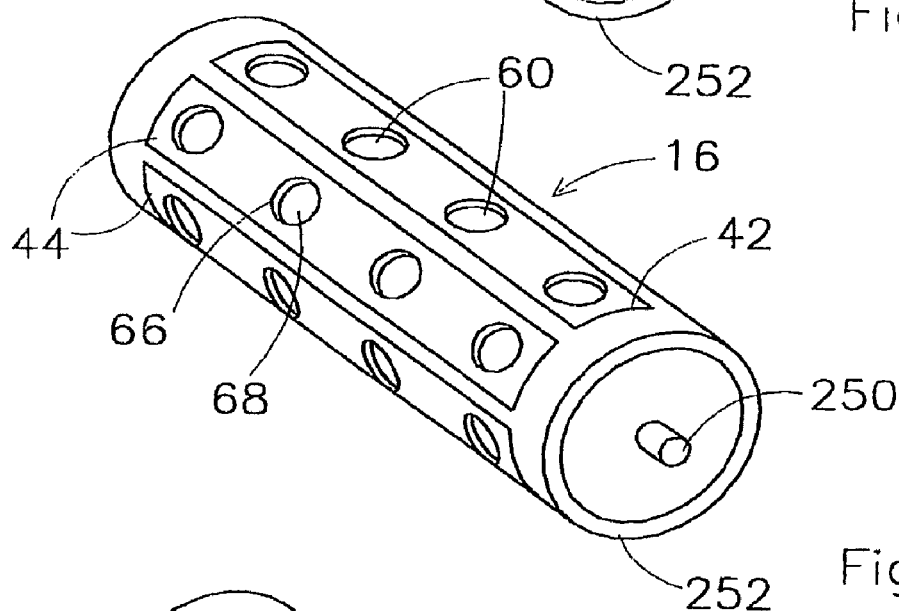
Figure 23:
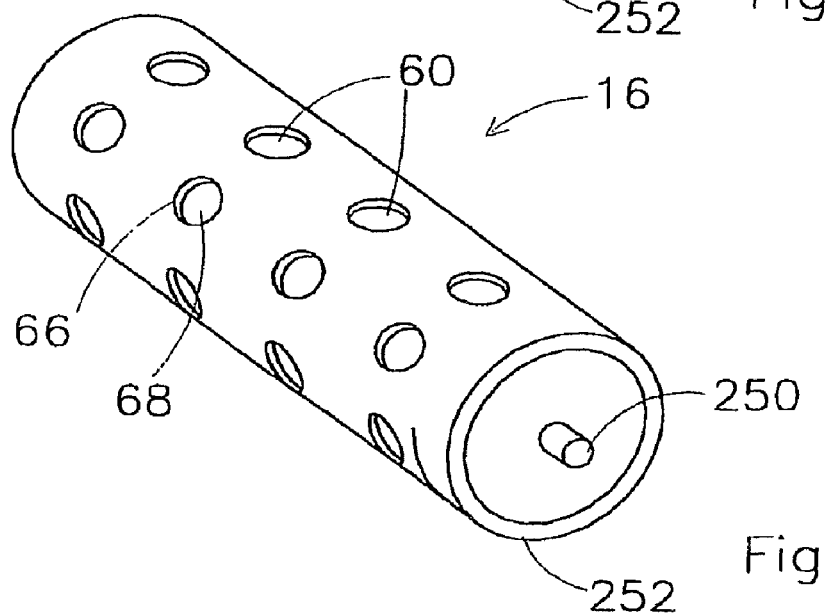

FIG. 11 diagrammatically depicts an embodiment of a moulding device with mass feed device in accordance with the invention;

FIG. 12 shows a detail of the mass feed device shown in FIG. 11;

FIG. 13 illustrates the operation of the mass feed device;

FIG. 14-15 show diagrammatic cross sections through various embodiments of a mould cavity with associated boundary;

FIG. 16-17 show detailed structures of various pore forms of a boundary of a mould cavity;

FIG. 18 shows a detailed view of an embodiment of a boundary of a mould cavity with a passage structure;

FIG. 19 diagrammatically depicts an embodiment of the method according to the invention;

FIG. 20 diagrammatically depicts another embodiment of the method according to the invention; and FIG. 21-23 show various embodiments of a moulding surface according to the invention.

DETAILED DESCRIPTION OF THE INVENTION

Figure 1:
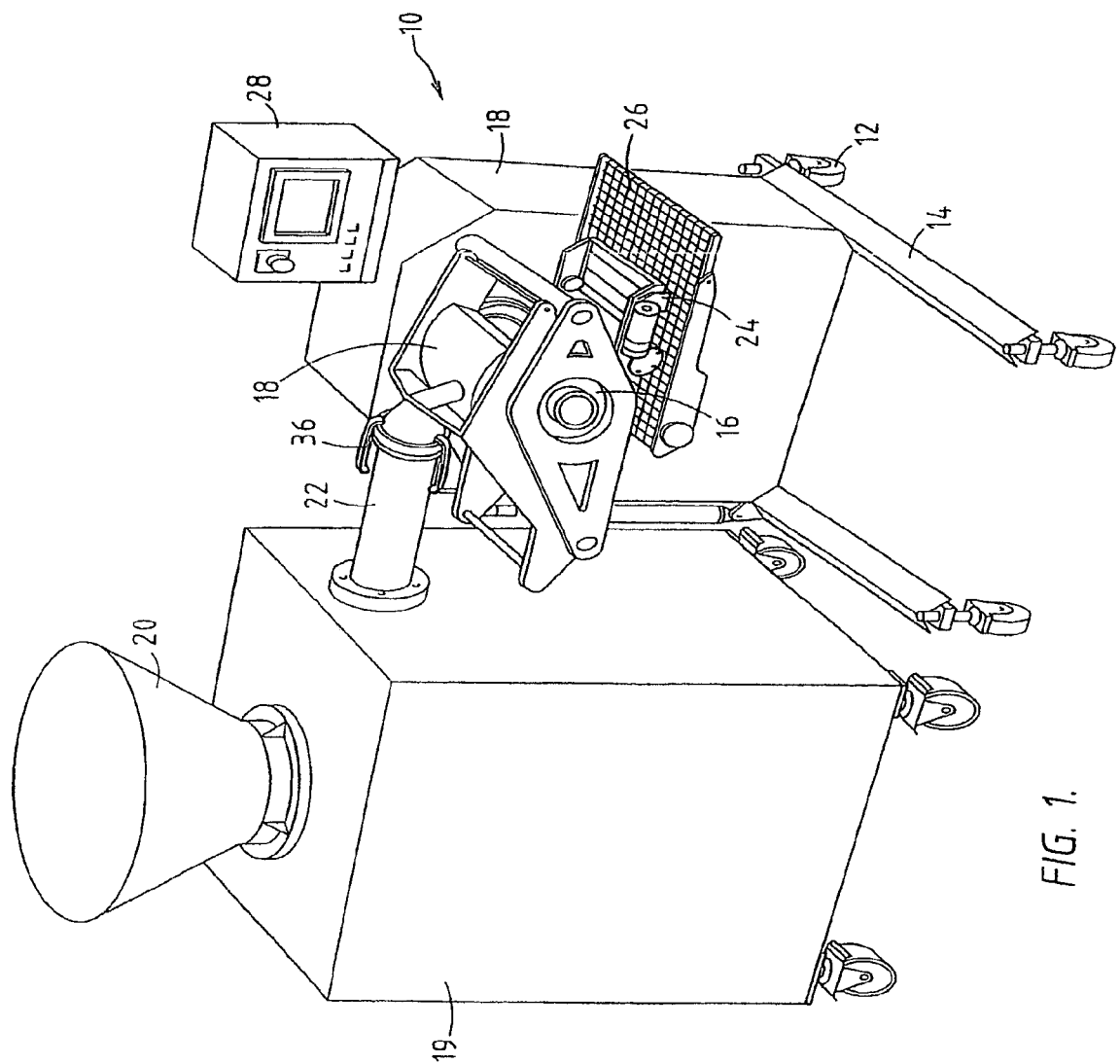
FIG. 1 shows a perspective view of an embodiment of a moulding device of the invention.
Figure 2:
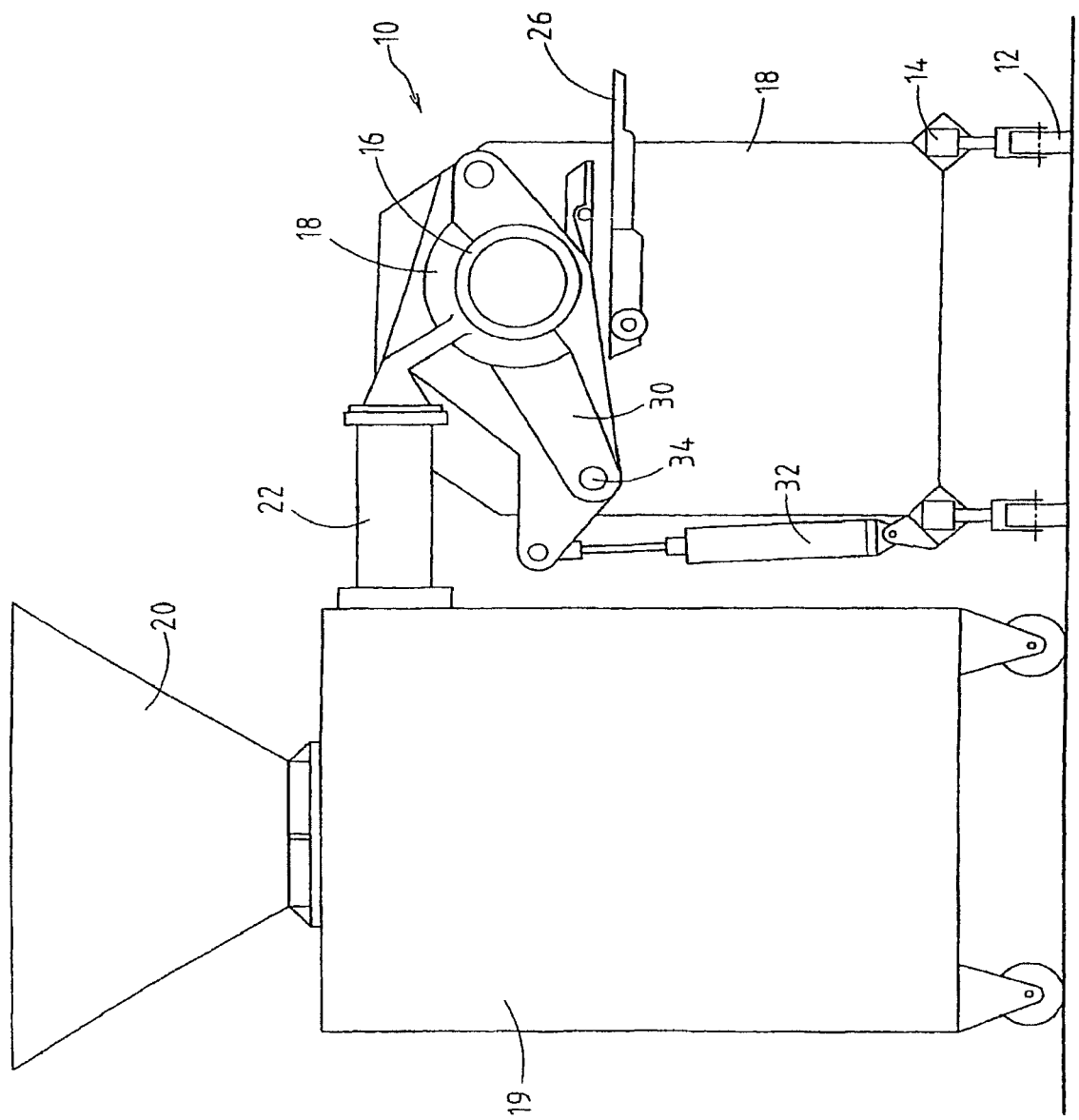
FIG. 2 shows a side view of the embodiment shown in FIG. 1.

FIG. 1 diagrammatically depicts a perspective view of an embodiment of a moulding device 10 according to the invention, while FIG. 2 shows a side view of this device.

The moulding device 10 comprises a frame 14 which can be moved with the aid of wheels 12. A moulding drum 16 is, mounted on the frame 14 in such a manner that it can be rotated about a horizontal axis and is coupled to a drive, for example an electric motor. The moulding drum 16 comprises mould cavities, which are not visible in FIGS. 1 and 2. A mass feed member 18 for feeding mass which is to be moulded to the mould cavities of the moulding drum comes into close contact with the outer circumference of the moulding drum 16. The mass is fed from a displaceable storage device 19 with introduction funnel 20 and then via a releasable connecting pipe 22 to the mass feed member 18 by means of an (optionally continuously) operating pump (not shown). In the vicinity of the underside of the moulding drum 16, there is a release device 24 for releasing moulded products from the mould cavities of the moulding drum 16, as well as a discharge belt 26 beneath it. Via this discharge belt 26, the products can be fed to other processing stations, for example a protein-coating device, a freezing device or a packaging installation. The moulding device 10 also comprises a control unit 28 for controlling the various components. With a view to making the device, in particular the moulding drum 16 and the mass feed member 18, accessible for maintenance and cleaning purposes, the mass feed member 18 is secured to a subframe 30, which can be rotated about a pivot pin 34 with the aid of a piston/cylinder assembly 32, so that the mass feed member 18 can be moved out of a working position illustrated in FIGS. 1 and 2 into an at-rest position (not shown) at a distance from the moulding drum 16 after coupling 36 between connecting pipe 22 and mass feed member 18 has been released.

Figure 3:
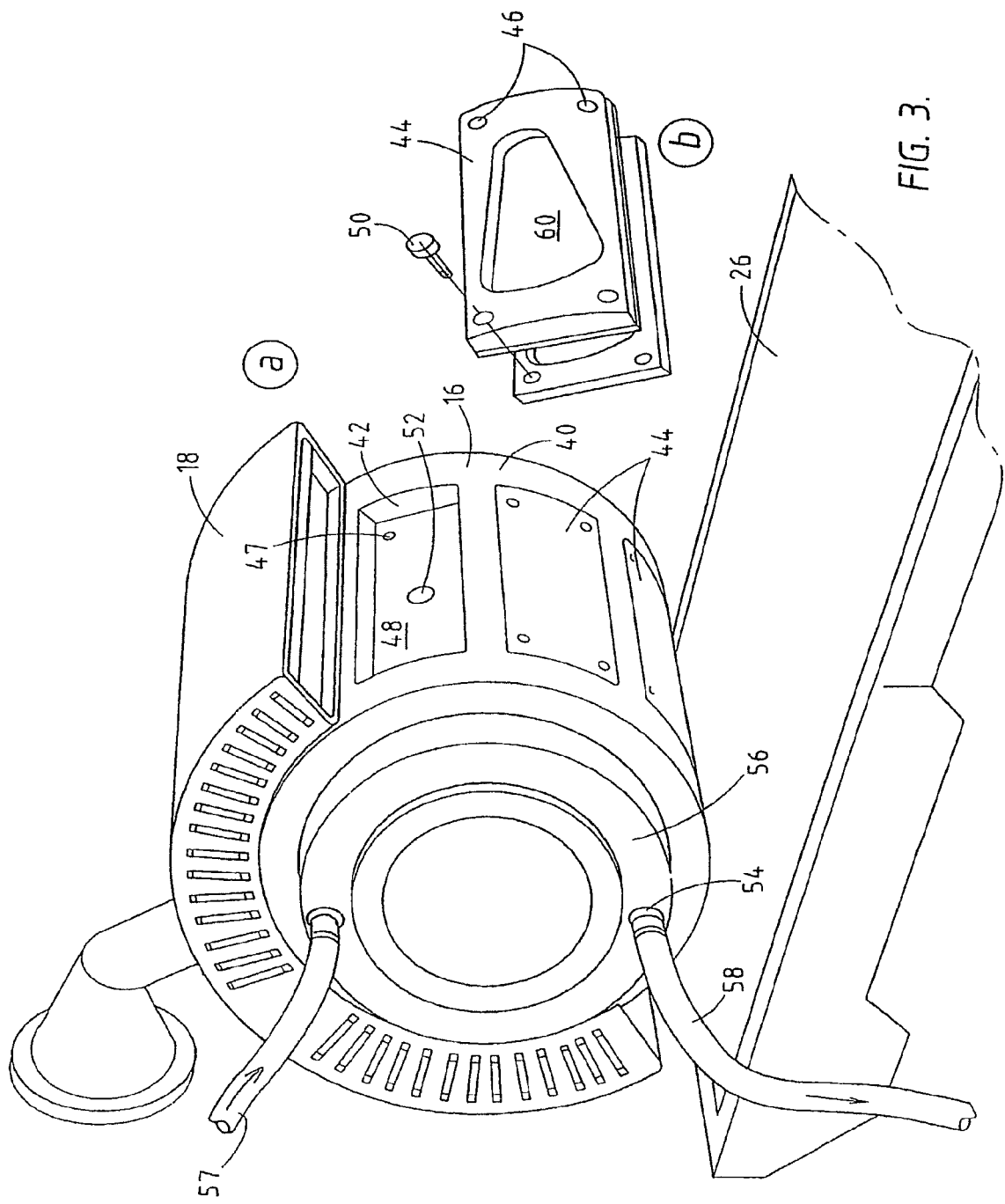
FIG. 3 shows an exploded perspective view of an embodiment of a moulding device with insert.

In the embodiment shown in FIG. 3a) and b), rectangular recesses 42 are provided in the outer circumference 40 of the moulding drum 16, which is in this case hollow. Exchangeable inserts 44 of corresponding dimensions can be secured in these recesses 42. For this purpose, bores 46 are provided at the corners of an insert 44, aligned with threaded holes 47 in the base 48 of the recess 42, and bolts 50 can be fitted into them. In the base 48 of a recess 42 there is an opening 52 which is in communication, via one or more axial connecting passages and distribution device (not shown), with an opening 54 in an end piece 56 of the moulding drum 16. This opening 54 is in communication with excess-pressure means (not shown), such as a compressor, for supplying a forcing fluid via a flexible hose 57, and with reduced-pressure means (not shown), for example a vacuum pump, via a flexible hose 58. In its top side, the insert 44 comprises a mould cavity 60 of a shape which corresponds to the shape of the product which is to be produced.

Figure 4:
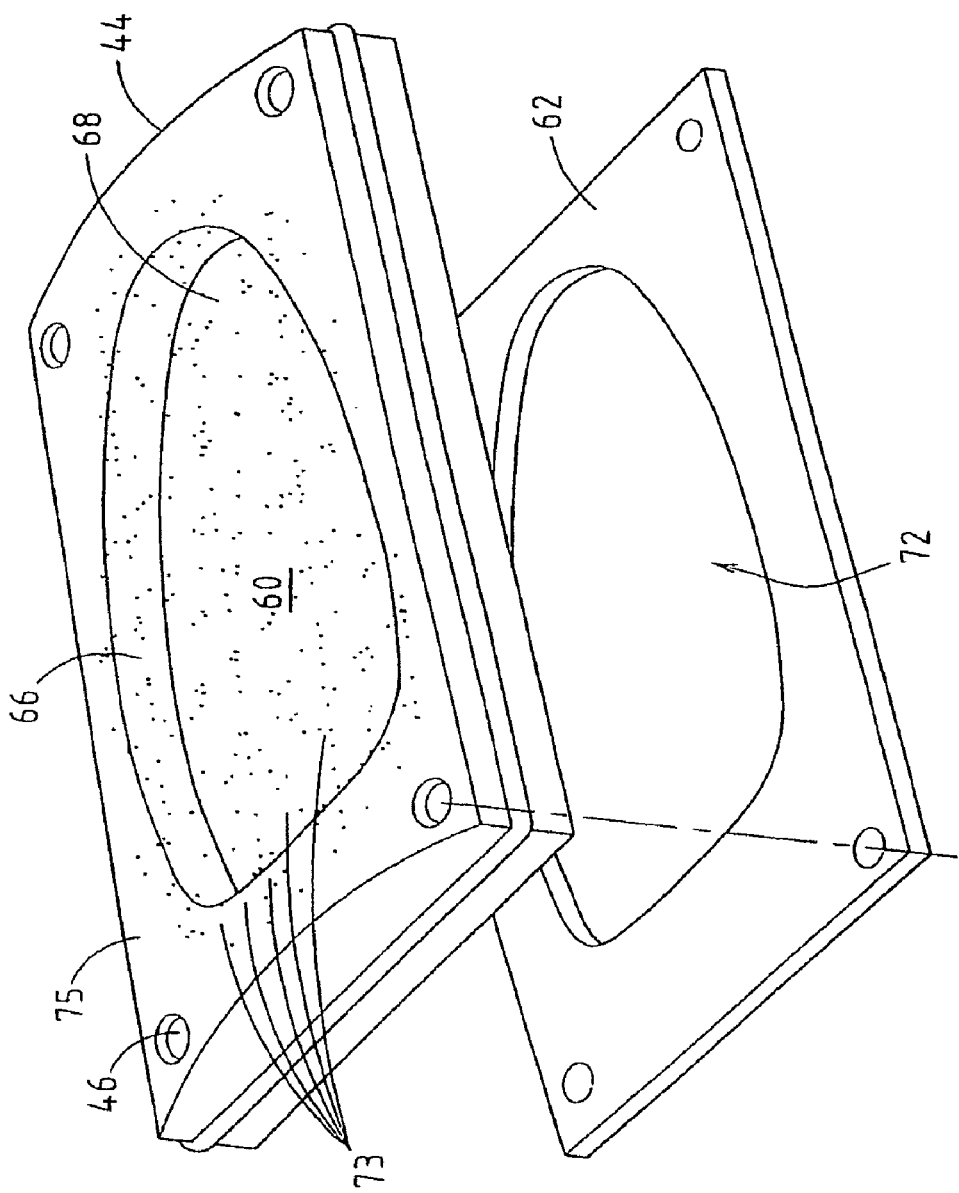
FIG. 4 shows a view of an embodiment of an insert with mould cavity.

In the embodiment shown in FIG. 4, the insert 44 together with spacer 62, forms an assembly 64. Insert 44 comprises the mould cavity 60 delimited by vertical walls 66 and base 68, while spacer 62 is a flat plate in which there is a through-opening 72, the dimensions of which are larger than the mould cavity 60. The insert 44 is made from a porous material, such as sintered steel. The pores are denoted by reference numeral 73. They open out in the base 68 and peripheral wall 66. Therefore, in the assembled state, there is a space between the underside of this insert 44 and the base 48 of the recess 42, this space also being delimited by the peripheral wall 74 of the opening 72 in spacer 62, which space is in communication with, on the one hand, the pores 73 in the insert 44 and, on the other hand, the opening 52, so that during operation the mould cavity 60 can be efficiently evacuated, and during the release operation a forcing fluid can be supplied between product and boundary. The insert 44 is a rectangular body with a flat underside and sides, apart from the top side 75, which is curved. The radius of curvature of the curved upper side 75 is identical to the radius of curvature of the moulding drum 16.

FIG. 5 illustrates the way in which this embodiment of a device 10 according to the invention operates. The mass which is to be moulded is forced into the mould cavity 60, which is in a filling position, via the mass feed member 18, while air is being sucked out of this mould cavity 60 through the pores in the insert 44 in question, the opening 52 and a connecting passage 76 with the aid of reduced-pressure means. This mould cavity 60 is filled during the rotation (direction of rotation indicated by an arrow) of the moulding drum 16 past the filling position. As a result of further rotation, a mould cavity 60 moves into a release position where a moulded product 78, under the force of gravity, drops out of the mould cavity 60 onto a discharge belt 26 moving beneath it. The release is assisted by supplying compressed air or other pressure medium, for example water, to the mould cavity 60 via the connecting passage 76 and the porous insert 44. The compressed air is supplied by excess-pressure means (not shown).

FIG. 6 shows the latter aspect in more detail. From the connecting passage 76, compressed air is passed through the opening 52 in the base 48 of the recess 52 in the drum 16 into distribution space 82, from where the compressed air (indicated by arrows) forces its way through the pores in the boundary of the insert 44 and expels a product.

For the sake of simplicity, FIG. 3-6 in each case illustrate a combination of excess-pressure means and reduced-pressure means. As will be clear from the general description given above, the two aspects can also be employed separately.

FIG. 14 shows an embodiment of a mould cavity 60 with a permeable boundary with a complete pore structure for the base 68 and peripheral wall 66. In addition to the pores 73, passages 200 are provided in the base 68. In the situation illustrated, the pores 73 are fed with a gaseous forcing fluid, such as compressed air, via a separate feed 202. The passages 200 are provided with a liquid forcing fluid, such as water, via a separate feed 204. As an alternative to a separate supply, it is also possible to use a mixture of liquid and gaseous forcing fluids.

FIG. 15 shows yet another embodiment, in which the boundary of a mould cavity 60 is of layered structure. An innermost boundary layer 206 comprises a pore structure, while the outermost boundary layer 208 is provided with passages 200. A forcing fluid is introduced into a distribution chamber 212 via feed 210. From there, the fluid flows through the passages 200 and then via the pores 73 and into the mould cavity.

FIGS. 16 and 17 show two different pore structures. One is composed of sintered, substantially round metal grains (FIG. 16) and one is composed of sintered, irregularly shaped metal particles. In the case of the pore structure shown in FIG. 17, the risk of a meat mass or small pieces of meat sticking in the pores is lower than in the case of the structure shown in FIG. 16, since the depth of penetration of the mass is lower on account of the relatively high resistance caused by the irregular nature of the pores.

FIG. 18 shows a boundary part with irregular passages 200 which taper from the outside towards the mould cavity 60.

FIG. 19 shows a boundary of a mould cavity 60 in which the boundary comprises a coating layer 220 which is given a surface charge by a reversible chemical reaction, repelling the oppositely charged particles (indicated as dipoles) from the product starting material.

FIG. 20 illustrates a method in which an additional electromagnetic repulsion force is generated in order to release a product from the mould cavity 60 with the aid of an electromagnet 222.

Figure 7:
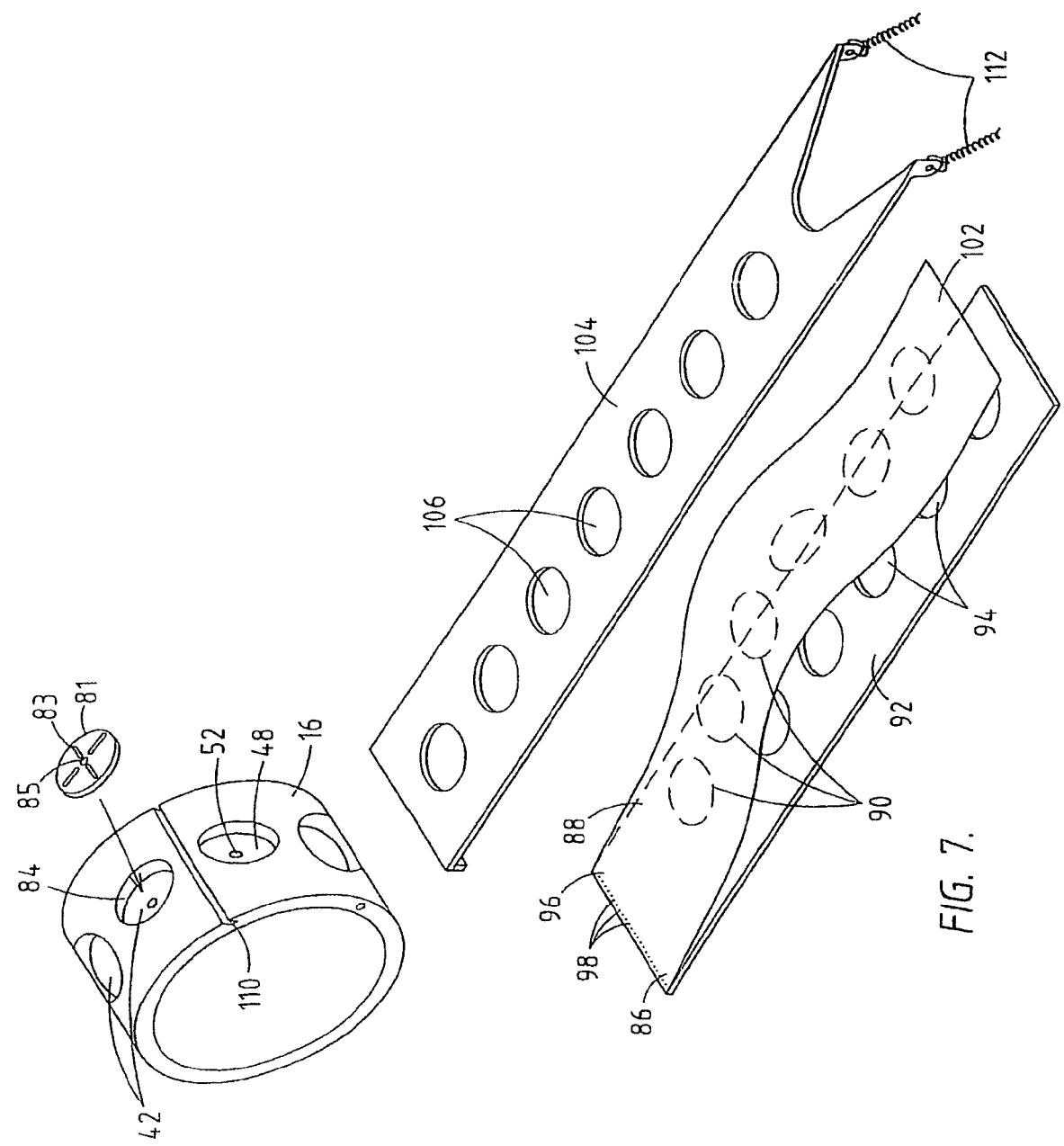
FIG. 7 shows another embodiment of a moulding device in accordance with the invention.

FIG. 7 shows another embodiment of a moulding device 10 according to the invention, in which components which correspond to those shown in FIG. 1-6 are denoted by the same reference numerals. The moulding drum 16 comprises recesses 42 which are distributed over its circumference and in which a filler piece 81 is positioned. In this case, the mould cavity 60 is delimited by the top side 83 of filler piece 81 and side walls 84 of the recess 42. The top side 83 in this case has a surface which is provided with a contour, so that an attractively shaped appearance can be imparted to the product. The mould cavities 60 of the moulding drum 16 can once again be selectively coupled to either reduced-pressure means or feed means, as described for a different embodiment with reference to FIGS. 5 and 6. For this purpose, an opening 52, which is aligned with bore 85 in filler piece 81, is provided in the base 48 of the recess 42. A web or strip 86 is wound around the moulding drum 16. This strip 86 has a sandwich structure and comprises an upper layer 88 made from a plastics material, in which flexible premoulds 90 are provided, substantially corresponding to a mould cavity 60, and, a lower layer 92, which during operation is in contact with the outer circumference of the moulding drum 16 and is made from a more rigid material, in which there are round openings 94, the diameter of which in this case substantially corresponds to that of the premoulds 90 and therefore to that of the mould cavities 60. The two layers 88 and 82 are connected to one another in a suitable way. One end 96 of the web 86 of a sandwich structure is provided with securing means which interact with securing features on the drum 16. An example is a row of small openings 98 which are positioned over short projections on the drum 16. The free end 102 of the web may be fixed to the drum 16 or to itself, for example using adhesive tape or the like. To protect the web 86, there is a wear-resistant material, for example stainless steel, protective strip 104, in which openings 106 which likewise correspond to the flexible premoulds are provided. One end of the protective strip 104 has a flanged edge 108 which, during operation, engages in an axial groove 110 provided in the outer circumference of the drum 16. The other end 112 has spring securing means 114 at its corners, and these means can be fixed to projections on the drum 16, so that the protective strip 104 can be clamped taut around the drum 16 and in this way also holds the flexible strip 86 beneath it in place.

During operation, at the filling position the flexible premoulds 90 in the mould cavities 62 are filled with mass or a portion of mass, it being possible for the air which is present beneath the flexible premould 90 in the mould cavity 60 to be sucked out, for example via the central bore 85 in filler piece 81 and opening 52 connected to it in the base 48 of recess 42, which opening can be connected to reduced-pressure means via an axial connecting passage in the manner described above. At the release position (FIG. 8), the flexible premould 90 is pushed out of the mould cavity 60 with the aid of compressed air, which is led to the mould cavity 60 in the manner which has likewise already been described, and the moulded product 78 can be released, if desired with the assistance of a release device, for example a spindle belt which is to be described below.

Figure 8:
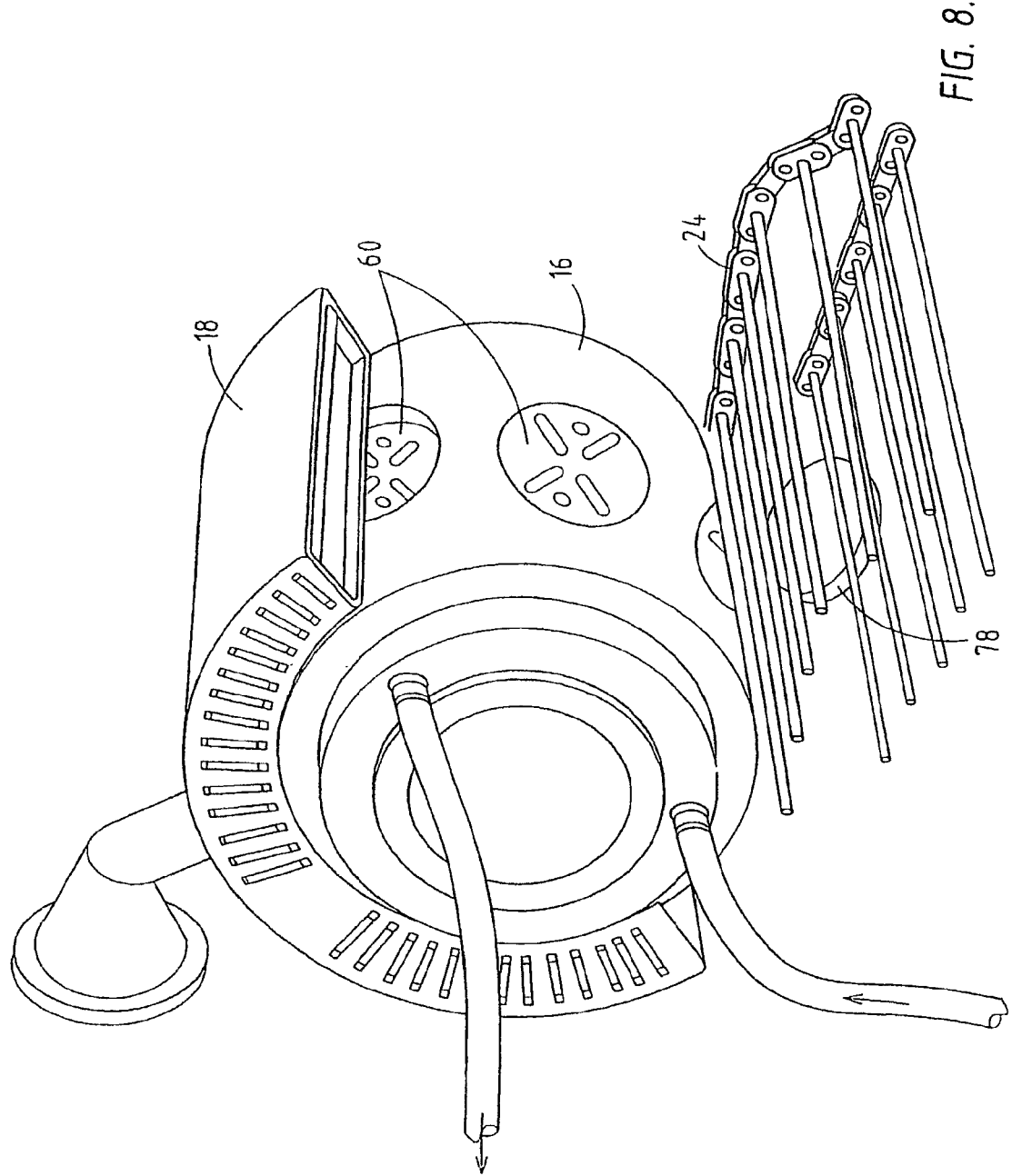
FIG. 8 shows an embodiment of a moulding device with release device in accordance with the invention.
Figure 9:
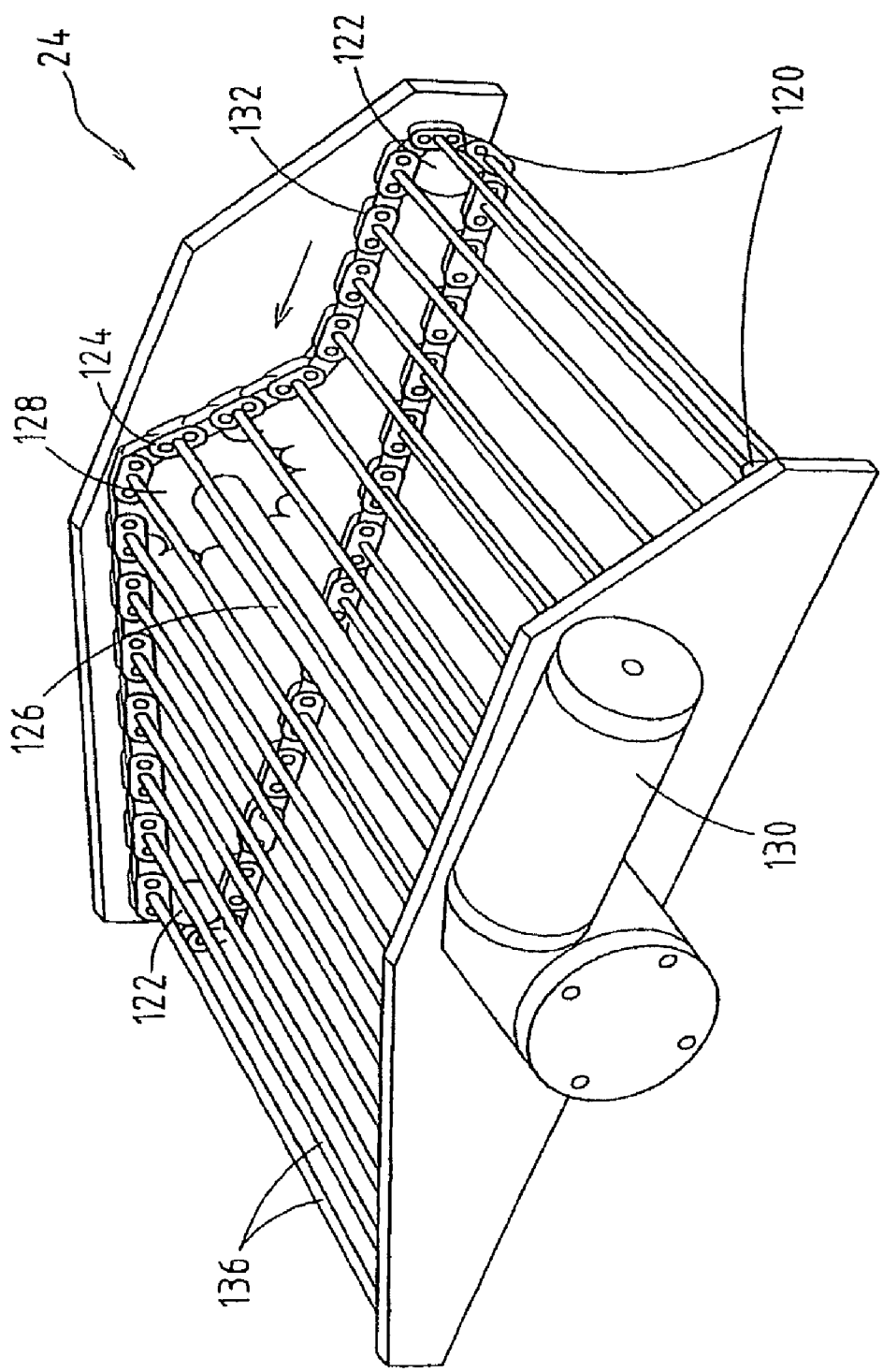
FIG. 9 shows the release device presented in FIG. 8 in more detail.
Figure 10:
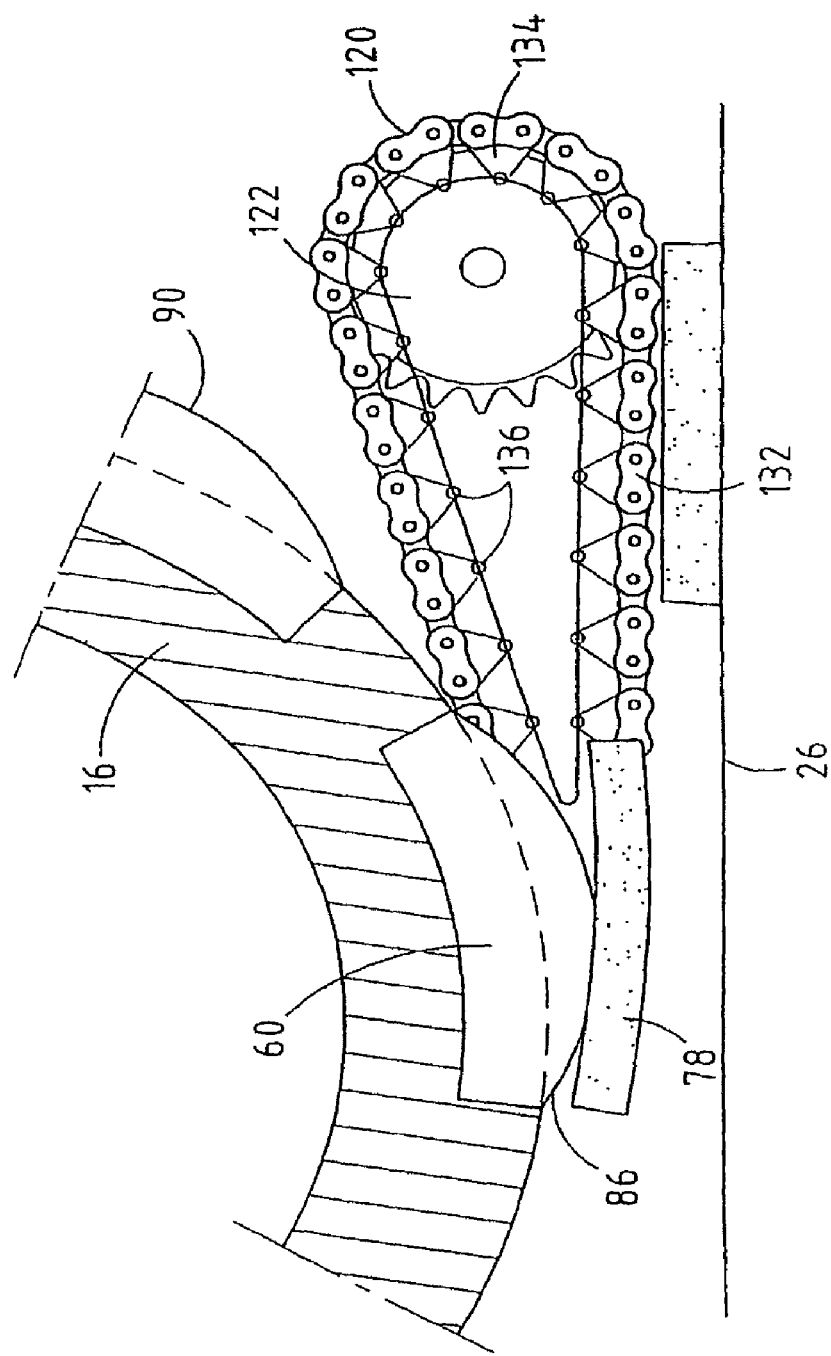
FIG. 10 shows the operation of the release device illustrated in FIG. 8.

The release device 24 shown in FIG. 8-10 is arranged beneath the moulding drum 16 at the release position and in the situation illustrated comprises an endless conveyor. This conveyor comprises two endless chains 120 which are arranged parallel to one another and are guided in a fixed path over toothed wheels 122. Toothed wheels 128 arranged on a common driven axle 126 engage in the vicinity of the centre of a top part 124, moving towards the drum 16, of the conveyor. A drive unit is denoted overall by reference numeral 130. The links 132 of the chains 120 (cf. FIG. 10) are lengthened on the inner side by an extension piece 134 which projects inwards. Extension pieces 134 of corresponding links 132 of the two endless chains 120 are connected to one another by thin transverse spindles 136, in such a manner that the transverse spindles 136, at the reversing point, pass through the centre of the axis of the toothed wheel 122 in question. This results in the formation of a pointed nose which is responsible for further removing moulded products 78 from the mould cavity 60.

FIG. 11 diagrammatically depicts an embodiment of a mass feed member 18, in which identical components are once again denoted by identical reference numerals. The mass feed member 18 comprises a virtually semicircular housing 140 with a through-passage 142 extending in the radial direction (cf. also FIG. 13) with an inlet 144 for the mass which is to be moulded from a storage device 19 and an outlet 146 for the mass to pass to a mould cavity 60. Side walls 148 and 150 of the housing 140 are provided with openings 152 extending in the radial direction. Radially movable lamellae 154, for example made from metal, are arranged between corresponding openings 152 in the side walls 148, 150. The central part of the mass feed member 18 comprises a filler block 156 which is fixedly connected to the housing and in which the through-passage 142 is provided. That side of the mass feed, member 18 which faces towards the moulding drum 16 comprises a plate 158 made from a flexible plastic, for example Teflon, in which the outlet 146 to a mould cavity 60 is provided. Between the inner wall of the housing 140 and the lamellae 154 there is a pressure cushion 160 which can be pressurized using a suitable pressure medium, such as compressed air or pressurized water or other liquid. In this way, during operation, the Teflon plate 158 is pressed onto the moulding drum 16 in such a manner as to form a seal, the lamellae 154 forming a large number of ribs which extend in the axial direction of the moulding drum 16 and impart the required rigidity, while the Teflon plate 158 is able to adapt to possible deviations in the radius of the moulding drum 16. On one side of the through-passage 152 there is a cutting blade 170 for cutting through tough pieces, such as muscle fibres.

In the embodiment of the moulding drum 16 illustrated in this figure, there are provided, in its outer wall, recesses 42 which have a widened base 162, extend in the longitudinal direction and into which corresponding inserts 44 with a mould cavity 60 can be pushed from the corresponding end of the moulding drum 16.

FIG. 21 shows a perspective illustration of an exchangeable moulding drum 16 as an embodiment of a moulding surface according to the invention. The moulding drum 16, which can rotate about an axle 250, comprises a cylindrical drum wall 252. The outer side of the cylindrical drum wall 252 comprises recesses 42. In each recess 42 there is an insert 44, which insert 44 comprises a mould cavity 60 which is defined by a boundary provided with holes, namely walls 66 and base 68. In the embodiment illustrated, all the mould cavities 60 are identical in shape. It is also possible for the shape of the mould cavities to differ, for example for each annular drum-wall part to have identically shaped mould cavities, while the shape of the mould cavities differs from one annular drum-wall part to another. It is therefore relatively easy to make a range of products of different shapes and then package these products.

FIG. 22 shows a moulding drum similar to that shown in FIG. 21, except for the fact that the exchangeable inserts 44 are elements which extend in the longitudinal direction of the drum and are each provided with four mould cavities 60.

FIG. 23 shows a particularly preferred embodiment of a moulding drum 16 according to the invention which can be exchanged in its entirety. The moulding drum 16 comprises a piece of porous metal, the surface pores of which have been sealed at the outer surface and the inner surface. The mould cavities 60 are formed by spark erosion, with the result that the boundary, comprising base 68 and side walls 66, has acquired the porous structure, since the pores are uncovered as a result. It is easier to replace one moulding drum with another than to exchange the removable inserts as used in the embodiments shown in FIGS. 21 and 22.

The invention claimed is:

1. Method of manufacturing a rotatable moulding drum for moulding three-dimensional products from a mass of foodstuff starting materials which are suitable for consumption, comprising the following steps:
   providing a cylindrical, single, continuous, one-piece drum wall of porous plastic or porous sintered metal forming a porous structure of intercommunicating pores opening out at an inner peripheral surface and an outer peripheral surface of the drum wall,
   sealing off at least the pores opening out at the outer peripheral drum wall surface,
   sealing off the pores opening out at the inner peripheral drum wall surface, and
   forming multiple mould cavities in the outer peripheral surface of the porous moulding drum wall so that the pores open out in the mould cavities, which mould cavities define the shape of the products which are to be produced.

2. Method according to claim 1, wherein the plurality of mould cavities is arranged in at least two adjacent rows of mould cavities.

3. Method of manufacturing a rotatable moulding drum for moulding three-dimensional products from a mass of foodstuff starting materials which are suitable for consumption, comprising the following steps:
   providing a cylindrical, single, continuous, one-piece drum wall of porous plastic or porous sintered metal forming a porous structure of intercommunicating pores opening out at an inner peripheral surface and an outer peripheral surface of the drum wall,
   sealing off at least the pores opening out at the outer peripheral drum wall surface,
   forming multiple mould cavities in the outer peripheral surface of the porous moulding drum wall so that the pores open out in the mould cavities, which mould cavities define the shape of the products which are to be produced, and
   providing openings in the inner peripheral surface of the porous moulding drum wall below the mould cavities.

4. Method according to claim 3, comprising the step of sealing off the pores opening out at the inner peripheral drum wall surface.

5. Method of manufacturing a rotatable moulding drum for moulding three-dimensional products from a mass of foodstuff starting materials which are suitable for consumption, comprising the following steps:
   providing a cylindrical, single, continuous, one-piece drum wall of porous plastic or porous sintered metal forming a porous structure of intercommunicating pores opening out at an inner peripheral surface and an outer peripheral surface of the drum wall, sealing off at least the pores opening out at the outer peripheral drum wall surface, forming multiple mould cavities in the outer peripheral surface of the porous moulding drum wall so that the pores open out in the mould cavities, which mould cavities define the shape of the products which are to be produced, and providing an inner cylinder inside the drum wall adjacent the inner peripheral surface.

6. Method according to claim 5, further comprising the step of providing axial connecting passages in the inner cylinder opening out in an end piece of the inner cylinder, to provide communication between the openings in the inner peripheral surface and the opening in the end piece of the inner cylinder.

7. Method according to claim 6, providing excess-pressure means for supplying a forcing fluid to the opening in the end piece of the inner cylinder.

8. A rotatable moulding drum for moulding three-dimensional products from a mass of foodstuff starting materials which are suitable for consumption, the moulding drum comprising:

a cylindrical, single, continuous, one-piece drum wall of porous plastic or porous sintered metal forming a porous structure of intercommunicating pores opening out at an inner peripheral surface and an outer peripheral surface of the drum wall, wherein at least the pores opening out at the outer peripheral drum wall surface are sealed off, wherein also the pores opening out at the inner peripheral drum wall surface are sealed off, and multiple mould cavities formed in the outer peripheral surface of the porous moulding drum wall so that the pores open out in the mould cavities, which mould cavities define the shape of the products which are to be produced.

9. Drum according to claim 8, wherein the plurality of mould cavities is arranged in at least two adjacent rows of mould cavities.

10. A rotatable moulding drum for moulding three-dimensional products from a mass of foodstuff starting materials which are suitable for consumption, the moulding drum comprising:

a cylindrical, single, continuous, one-piece drum wall of porous plastic or porous sintered metal forming a porous structure of intercommunicating pores opening out at an inner peripheral surface and an outer peripheral surface of the drum wall, wherein at least the pores opening out at the outer peripheral drum wall surface are sealed off, multiple mould cavities formed in the outer peripheral surface of the porous moulding drum wall so that the pores open out in the mould cavities, which mould cavities define the shape of the products which are to be produced, and openings in the inner peripheral surface of the porous moulding drum wall below the mould cavities.

11. Drum according to claim 10, wherein also the pores opening out at the inner peripheral drum wall surface are sealed off.

12. A rotatable moulding drum for moulding three-dimensional products from a mass of foodstuff starting materials which are suitable for consumption, the moulding drum comprising:

a cylindrical, single, continuous, one-piece drum wall of porous plastic or porous sintered metal forming a porous structure of intercommunicating pores opening out at an inner peripheral surface and an outer peripheral surface of the drum wall, wherein at least the pores opening out at the outer peripheral drum wall surface are sealed off, multiple mould cavities formed in the outer peripheral surface of the porous moulding drum wall so that the pores open out in the mould cavities, which mould cavities define the shape of the products which are to be produced, and an inner cylinder inside the drum wall adjacent the inner peripheral surface.

13. Drum according to claim 12, wherein axial connecting passages are provided in the inner cylinder, opening out in an end piece of the inner cylinder, to provide communication between the openings in the inner peripheral surface and the opening in the end piece of the inner cylinder.

14. Method of manufacturing a rotatable moulding drum for moulding three-dimensional products from a mass of foodstuff starting materials which are suitable for consumption, comprising the following steps:

providing a moulding drum comprising a cylindrical drum wall comprising recesses in which corresponding inserts can be releasably accommodated, providing inserts being made from a single piece of porous plastic or porous sintered metal forming a porous structure of intercommunicating pores opening out at upper and lower surfaces of the insert, sealing off at least the pores opening out at the outer peripheral drum wall surface, forming multiple mould cavities in the upper surface of the porous inserts so that the pores open out in the mould cavities, which mould cavities define the shape of the products which are to be produced, accommodating corresponding inserts into recesses.

15. Method according to claim 14, wherein the plurality of mould cavities is arranged in at least two adjacent rows of mould cavities.

16. Method according to claim 14, further comprising the step of providing openings in the inner peripheral surface of the porous moulding drum wall below the mould cavities.

17. A rotatable moulding drum for moulding three-dimensional products from a mass of foodstuff starting materials which are suitable for consumption, the moulding drum comprising:

a cylindrical drum wall comprising recesses in which corresponding inserts are releasably accommodated, the inserts being made from a single piece of porous plastic or porous sintered metal forming a porous structure of intercommunicating pores opening out at upper and lower surfaces of the insert, and multiple mould cavities formed in the upper surface of the porous inserts, so that the pores open out in the mould cavities, which mould cavities define the shape of the products which are to be produced, wherein at least the pores opening out are sealed off.

18. Drum according to claim 17, wherein the inserts are exchangeable, so that a variety of products can be moulded using the same moulding drum.

19. Drum according to claim 17, wherein the plurality of mould cavities is arranged in at least two adjacent rows of mould cavities.

20. Method for moulding three-dimensional products from a mass of foodstuff starting materials which are suitable for consumption, comprising the following steps:

providing a cylindrical, single, continuous, one-piece drum wall of porous plastic or porous sintered metal forming a porous structure of intercommunicating pores opening out at an inner peripheral surface and an outer peripheral surface of the drum wall, sealing off at least the pores opening out at the outer peripheral drum wall surface, forming multiple mould cavities in the outer peripheral surface of the porous moulding drum wall so that the pores open out in the mould cavities, which mould cavities define the shape of the products which are to be produced, providing openings in the inner peripheral surface of the porous moulding drum wall below the mould cavities, and providing a frame, mounting the drum wall on the frame such that it can be rotated about a horizontal axis, and coupling the drum wall to a drive.

21. Method according to claim 20, wherein the plurality of mould cavities is arranged in at least two adjacent rows of mould cavities.

22. Method according to claim 20, further comprising the step of providing a mass feed member for feeding mass which is to be moulded to the mould cavities of the moulding drum wall in close contact with the outer peripheral surface of the drum wall.

23. Method for moulding three-dimensional products from a mass of foodstuff starting materials which are suitable for consumption, comprising the following steps:

providing a cylindrical, single, continuous, one-piece drum wall of porous plastic or porous sintered metal forming a porous structure of intercommunicating pores opening out at an inner peripheral surface and an outer peripheral surface of the drum wall, sealing off at least the pores opening out at the outer peripheral drum wall surface, forming multiple mould cavities in the outer peripheral surface of the porous moulding drum wall so that the pores open out in the mould cavities, which mould cavities define the shape of the products which are to be produced, providing an inner cylinder inside the drum wall adjacent the inner peripheral surface, and providing a frame, mounting the drum wall on the frame such that it can be rotated about a horizontal axis, and coupling the drum wall to a drive.

24. Method according to claim 23, further comprising the step of providing openings in the inner peripheral surface of the porous moulding drum wall below the mould cavities.

25. Method according to claim 23, further comprising the step of providing axial connecting passages in the inner cylinder opening out in an end piece of the inner cylinder, to provide communication between the openings in the inner peripheral surface and the opening in the end piece of the inner cylinder.

26. Method according to claim 25, providing excess-pressure means for supplying a forcing fluid to the opening in the end piece of the inner cylinder.

* * * * *